(12) United States Patent
Toriyabe

(10) Patent No.: US 10,992,841 B2
(45) Date of Patent: Apr. 27, 2021

(54) COLOR MANAGEMENT SYSTEM HAVING COLOR VARIFICATION OF CUSTOM COLOR AND STANDARD COLOR

(71) Applicant: CANON KABUSHIKI KAISHA, Tokyo (JP)

(72) Inventor: Hiroyuki Toriyabe, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 16/277,138

(22) Filed: Feb. 15, 2019

(65) Prior Publication Data

US 2019/0260911 A1 Aug. 22, 2019

(30) Foreign Application Priority Data

Feb. 20, 2018 (JP) .............................. JP2018-028210

(51) Int. Cl.
 *H04N 1/60* (2006.01)
 *G06T 11/00* (2006.01)
(52) U.S. Cl.
 CPC ......... *H04N 1/6044* (2013.01); *G06T 11/001* (2013.01); *H04N 1/603* (2013.01); *H04N 1/6008* (2013.01)
(58) Field of Classification Search
 CPC .... H04N 1/6044; H04N 1/603; H04N 1/6008; G06T 11/001
 See application file for complete search history.

(56) References Cited

U.S. PATENT DOCUMENTS

| | | |
|---|---|---|
| 6,147,698 A | 11/2000 | Zable et al. |
| 2004/0212816 A1 | 10/2004 | Tanabe et al. |
| 2006/0126106 A1 | 6/2006 | Harrington |
| 2010/0079524 A1 | 4/2010 | Saita et al. |
| 2011/0255109 A1 | 10/2011 | Kanamori |

(Continued)

FOREIGN PATENT DOCUMENTS

| | | |
|---|---|---|
| JP | H07-107313 A | 4/1995 |
| JP | 2002-290756 A | 10/2002 |

(Continued)

OTHER PUBLICATIONS

Best Remoteproof, https://web.archive.org/web/200607010000*/, Mar. 13, 2006.

*Primary Examiner* — Christopher Wait
(74) *Attorney, Agent, or Firm* — Venable LLP

(57) ABSTRACT

An information processing apparatus for managing a printing apparatus in a print site including at least one printing apparatus includes a memory that stores a set of instructions, and at least one processor that executes the instruction to determine a custom color that is used in a color verification operation of the at least one printing apparatus, obtain an input profile of a color verification setting of the determined custom color, display a screen for selecting whether or not to add a standard color corresponding to the obtained input profile to the color verification operation, and according to having received an instruction, via the screen, for adding the standard color to the color verification operation, instruct the at least one printing apparatus to perform printing in accordance with the color verification setting, including the input profile, for the custom color and the standard color.

13 Claims, 31 Drawing Sheets

(56) References Cited

U.S. PATENT DOCUMENTS

| | | |
|---|---|---|
| 2012/0188596 A1 | 7/2012 | Niles et al. |
| 2013/0011153 A1* | 1/2013 | Toriyabe ............ G03G 15/0189 |
| | | 399/49 |
| 2017/0208184 A1* | 7/2017 | Toriyabe ............... G06F 3/1229 |

FOREIGN PATENT DOCUMENTS

| | | |
|---|---|---|
| JP | 2008-228017 A | 9/2008 |
| JP | 2011-237358 A | 11/2011 |

* cited by examiner

| PATCH CHART | |
|---|---|
| ID | | ~1241
| NAME | | ~1242
| NUMBER OF PATCHES | | ~1243
| CUSTOM COLOR FLAG | | ~1247
| PATCH 001 | | ~1244
| PATCH 002 | | ~1245
| ... | |
| PATCH 0XX | | ~1246

1250

| REFERENCE | |
|---|---|
| ID | | ~1251
| NAME | | ~1252
| NUMBER OF PATCHES | | ~1253
| PATCH 001 | | ~1254
| PATCH 002 | | ~1255
| ... | |
| PATCH 0XX | | ~1256

1260

| DETERMINATION CRITERION | |
|---|---|
| ID | | ~1261
| NAME | | ~1262
| AVERAGE | | ~1263
| MAXIMUM | | ~1264
| PaperWhite | | ~1265
| Cyan 100% | | ~1266
| Magenta 100% | | ~1267
| Yellow 100% | | ~1268
| Black 100% | | ~1269

1270

| JOB PROPERTY | |
|---|---|
| ID | | ~1271
| NAME | | ~1272
| INPUT PROFILE | | ~1273
| OUTPUT PROFILE | | ~1274
| HALFTONE | | ~1275
| ... | |

FIG. 13

COLOR MANAGEMENT

PLEASE SELECT DESIRED OPERATION FROM FOLLOWING ITEMS

- ENVIRONMENT SETTING OF PRINTING APPARATUS — [NEXT] ~1301
- COLOR VERIFICATION RESULT OF PRINTING APPARATUS — [NEXT] ~1302
- REGISTRATION/DELETION OF PRINTING APPARATUS — [NEXT] ~1303

CURRENT COLOR MANAGEMENT STATE: ~1304
THERE IS ONE PRINTING APPARATUS IN NG

FIG. 14

COLOR MANAGEMENT, ENVIRONMENT SETTING

PRINTING APPARATUS: PRINTER_001 ~1401

1402 COLOR VERIFICATION PROFILE SETTING

1410 [ADD]  1411 [DELETE]

| # | VALID | COLOR VERIFICATION SETTING | COLOR VERIFICATION EXECUTION CONDITION | COLOR ADJUSTMENT SETTING |
|---|---|---|---|---|
| 001 | ✓ | DEV001_001 | Verify001 | ColorAdjust001 |
| 002 |   | DEV001_002 | Verify001 | ColorAdjust002 |
| 003 |   | DEV001_001 | Verify002 | ColorAdjust001 |

1403  1404  1405  1406

[EDIT] 1407   [EDIT] 1408   [EDIT] 1409

FIG. 17

| COLOR MANAGEMENT, ENVIRONMENT SETTING | ✕ |

REFERENCE ~1701      1702         1705

| NAME |
|---|
| Ref001 |
| Ref002 |
| Ref003 |

- EDIT (1705)
- DELETE (1706)
- CREATE (1707)

NUMBER OF PATCHES | 52 | ~1703

~1704

| # | TYPE | CMYK | L* | a* | b* | |
|---|---|---|---|---|---|---|
| 001 | CUSTOM COLOR | 34, 12, 55, 20 | XX | XX | XX | ▷ |
| 002 | CUSTOM COLOR | 78, 36, 2, 42 | XX | XX | XX | ▷ |
| ... | | | | | | |
| 021 | STANDARD | 0, 0, 0, 0 | 90.00 | 1.05 | −1.30 | ▷ |
| 022 | STANDARD | 10, 0, 0, 0 | XX | XX | XX | ▷ |

1708 ~ SAVE

FIG. 24

| | | COLOR MANAGEMENT, COLOR VERIFICATION RESULT | ✕ |
|---|---|---|---|

~2401
PRINTING APPARATUS  PRINTER_001     DETERMINATION RESULT  NG
COLOR VERIFICATION PROFILE  #001    EXECUTION DATE        4/03/2017, 8:10

~2402
PATCH MEASURED RESULT DETAIL

| # | CMYK | MEASURED VALUE | | | REFERENCE VALUE | | | dE |
|---|---|---|---|---|---|---|---|---|
| | | L | a | b | L | a | b | |
| 001 | 0,0,0,0 | 89.61 | 1.18 | −0.98 | 90.00 | 1.05 | −1.30 | 0.56 |
| 002 | 10,0,0,0 | XX | XX | XX | XX | XX | XX | XX |
| 003 | 20,0,0,0 | XX | XX | XX | XX | XX | XX | XX |
| 004 | 30,0,0,0 | XX | XX | XX | XX | XX | XX | XX |

FIG. 29

| 2901 | | |
|---|---|---|
| DETERMINATION CRITERION | | |
| ID | | ~1261 |
| NAME | | ~1262 |
| AVERAGE | | ~1263 |
| MAXIMUM | | ~1264 |
| PaperWhite | | ~1265 |
| Cyan 100% | | ~1266 |
| Magenta 100% | | ~1267 |
| Yellow 100% | | ~1268 |
| Black 100% | | ~1269 |
| SUB-DETERMINATION PRESENCE/ ABSENCE FLAG | | ~2902 |
| SUB-DETERMINATION CRITERION | | ~2903 |

| 2910 | | |
|---|---|---|
| DETERMINATION CRITERION | | |
| ID | | ~1261 |
| NAME | | ~1262 |
| AVERAGE | | ~1263 |
| MAXIMUM | | ~1264 |
| PaperWhite | | ~1265 |
| Cyan 100% | | ~1266 |
| Magenta 100% | | ~1267 |
| Yellow 100% | | ~1268 |
| Black 100% | | ~1269 |
| TARGET PATCH | | ~2911 |

FIG. 32

| COLOR MANAGEMENT, COLOR VERIFICATION RESULT | | | |
|---|---|---|---|
| PRINTING APPARATUS PRINTER_001 | | DETERMINATION RESULT | NG |
| COLOR VERIFICATION PROFILE #001 | | EXECUTION DATE | 4/03/2017, 8:10 |

DETERMINATION RESULT DETAIL

| ALL | CUSTOM COLOR | STANDARD COLOR | |
|---|---|---|---|
| DETERMINATION ITEM | MEASURED VALUE | REFERENCE VALUE | DETERMINATION RESULT |
| AVERAGE dE | 3.20 | 3.0 | NG |
| MAXIMUM dE | 4.11 | 5.0 | OK |
| PaperWhite | 0.56 | 1.0 | OK |
| Cyan100% | 1.81 | 2.5 | OK |

PATCH MEASURED RESULT DETAIL

COLOR MANAGEMENT SYSTEM HAVING COLOR VARIFICATION OF CUSTOM COLOR AND STANDARD COLOR

BACKGROUND OF THE INVENTION

Field of the Invention

The present invention relates to a color management system, and an information processing apparatus and a method of controlling the information processing apparatus, and a storage medium.

Description of the Related Art

In recent years, various printing apparatuses have been sold for the commercial printing market. Since printed products printed and output by these printing apparatuses are merchandise of customers, the requirement for the accuracy of colors of images printed on the printed products is high. However, the colors of an image printed by a printing apparatus vary due to various factors. For example, the colors vary depending on the degradation degrees of the parts of the printing apparatus, the environment (temperature and humidity) in which the printing apparatus is installed, consumables such as toner and sheets used when the printing apparatus prints, and the like.

On the site of commercial printing, a person generally called a color expert is deployed. The person performs a color management operation to keep the colors of an image printed by a printing apparatus to desired colors. The color management operation includes a plurality of steps. One of the steps is a color verification operation of verifying the colors of an image printed by a printing apparatus of a color management target. In the color verification operation, a predetermined chart is printed using the printing apparatus of the color management target, and the chart is measured by a colorimetric apparatus. The measured value is compared with a target value (reference) defined in advance. It is determined whether or not the colors of the image printed by the printing apparatus of the color management target satisfy a predetermined quality standard of color (whether the color difference between the measured value and the target value is equal to or less than a threshold). If the predetermined quality standard of color is satisfied (the color difference is equal to or less than the threshold), the printing apparatus is approved as a printing apparatus capable of executing subsequent printing steps.

On the other hand, if the predetermined quality standard of color is not satisfied (the color difference is more than the threshold), the color expert performs a color adjustment operation of the printing apparatus. The color adjustment operation is an execution operation of various kinds of calibration functions represented by gray scale correction. After the color adjustment operation, the color expert performs the color verification operation again and verifies whether or not the colors of an image printed by the printing apparatus reach the predetermined quality standard of color. If the printing apparatus cannot reach the predetermined quality standard of color even after execution of the color adjustment operation, the color expert performs color adjustment operations of higher difficulty such as color profile re-creation and fine adjustment of image forming conditions. Furthermore, the color expert sometimes accumulates the data of the result of the color verification operation and uses the data for an application purpose such as grasping of the characteristics of the printing apparatus or verification of a temporal change.

The operation burden on the color expert is very large because he/she sometimes executes the above-described color management operation for a plurality of printing apparatuses installed in the print site under the management of the color expert. Note that the user of the color management system is not limited to the color expert. For example, in some cases, an operator who is a worker actually operating the printing apparatus executes sheet feed in the color verification operation, error recovery processing from paper jam or the like, and the color adjustment operation. In general, since the degree of skill of the operator is lower than that of the color expert, it is difficult for the operator to complete the difficult color management operation at his/her own discretion. Hence, in the color management operation, there is demand for a system capable of executing the color management operation by an easy operation independently of the degree of skill of the user. In addition, the efficiency of the operation needs to be raised to reduce the burden of the color management operation for a plurality of printing apparatuses.

The above-described color verification operation generally aims at the quality standard of color defined by various kinds of color standards. More specifically, color patches defined by a standard such as Japan Color 2011 or Fogra 51 are used. The measured result of the color patches is compared with a defined reference, thereby verifying the quality of color. The number of color patches forming a color patch group, the signal value, and the reference change depending on the standard.

On the other hand, Japanese Patent Laid-Open No. 2008-228017 describes a technique of extracting representative colors from the data of a print job used by a user. Also known is a technique of printing representative colors extracted from the data of a print job in the margin of an image and using them for the color verification operation.

When the color verification operation is executed using only colors (custom colors) extracted from specific print data, the quality standard of color of the entire color space cannot be verified. Hence, the color expert generally simultaneously executes the color verification operation of standard colors aiming at the quality standard of color. For the color verification operation of the standard colors, the color expert himself/herself needs to do settings or execution instruction. At this time, since the color verification operation of custom colors and standard colors aims at increasing verification target colors under the same condition, the processes should be executed under the same color setting. More specifically, the processes should be executed under the same input profile setting (CMYK simulation setting). Upon determining as the result of the color verification operation that the predetermined quality standard of color is not satisfied, the color adjustment operation of the same contents is executed for the processes.

In a case in which the color verification operation of the custom colors and that for the standard colors are executed under the same condition, if the result of one color verification operation is determined as NG, and the color adjustment operation is executed, the operation affects the result of the other color verification operation as well. Because of the same condition, the color adjustment operation exerts the effect on the chart output processing of both color verification operations. For example, assume that in a case in which the color verification operation is executed in the order of custom colors and standard colors, the result of the color verification operation of the custom colors is determined as OK, and the result of the color verification operation of the standard colors is then determined as NG. At this time, the color adjustment operation executed by the color expert exerts the effect on the quality of color of the custom colors determined as OK first. Hence, to strictly manage the quality of color, after the result of the color verification operation of the standard colors is determined as OK by the color adjustment operation, it is necessary to execute the color verification operation of the custom colors again and verify that the result is determined as OK.

However, in a general system having color verification processing, when the result of certain color verification processing is determined as NG, color verification processing re-executed after execution of color adjustment processing aims at only the color determined as NG. Hence, re-execution of color verification processing for another color needs to be instructed by the color expert himself/herself, the operation burden on the color expert becomes large. This may also impede introduction of the strict color management operation into a print site. To reduce the operation burden on the color expert, there is demand for a technique of simultaneously verifying custom colors and standard colors by one operation. Note that when simultaneously executing the color verification processing of the standard colors and that of the custom colors, color settings, that is, input profile settings need to be the same, as described above.

Japanese Patent Laid-Open No. 2011-237358 describes a technique of simultaneously handling standard colors and important colors extracted from print job data. In this technique, both the color patches of the important colors and standard colors are arranged on the same color chart and used for the color adjustment function or color profile creation. In this technique, when deciding the patch of the standard colors, the purpose (color adjustment or color profile creation) and the information of the number of steps designated by the user are referred to, and color patches in a predetermined range are extracted at even intervals. That is, when selecting color patches, the input profile setting for the custom colors is not taken into consideration. For this reason, when executing the color verification operation of the standard colors under an appropriate condition according to the input profile setting for the custom colors, setting and execution instruction operations by the color expert are needed, and the operation burden cannot be reduced.

SUMMARY OF THE INVENTION

An aspect of the present invention is to eliminate the above-mentioned problem with conventional technology.

A feature of the present invention is to provide a technique of automatically doing settings for color verification processing of custom colors and color verification processing of standard colors and thus reducing the operation burden.

According to a first aspect of the present invention, there is provided an information processing apparatus for managing a printing apparatus in a print site including at least one printing apparatus, comprising: a memory that stores a set of instructions; and at least one processor that executes the instruction to: add a custom color designated by a user, which is used in a color management operation of the at least one printing apparatus; specify an input profile of a color verification setting of the added custom color; set a first color verification setting by a standard color for the specified input profile and a second color verification setting by the custom color based on the input profile; and instruct the at least one printing apparatus to perform the color management operation in accordance with the set first color verification setting and the set second color verification setting.

According to a second aspect of the present invention, there is provided a color management system including an information processing apparatus and a printing apparatus arranged in a print site, wherein the information processing apparatus, comprises: a first memory that stores a set of instructions; and at least one first processor that executes the instruction to: add a custom color designated by a user, which is used in a color management operation of the at least one printing apparatus; specify an input profile of a color verification setting of the added custom color; set a first color verification setting by a standard color for the specified input profile and a second color verification setting by the custom color based on the input profile; and instruct the at least one printing apparatus to perform the color management operation in accordance with the set first and second color verification settings, and wherein the printing apparatus comprises: a second memory that stores a set of instructions; and at least one second processor that executes the instruction to: as the color management operation, print a chart in accordance with the first color verification setting and the second color verification setting and transmit a value obtained by measuring the chart as a result of the color verification to the information processing apparatus.

According to a third aspect of the present invention, there is provided a method of controlling an information processing apparatus for managing a printing apparatus in a print site including at least one printing apparatus, the method comprising: adding a custom color designated by a user, which is used in a color management operation of the at least one printing apparatus; specifying an input profile of a color verification setting of the added custom color; setting a first color verification setting by a standard color for the specified input profile and a second color verification setting by the custom color based on the input profile; and instructing the at least one printing apparatus to perform the color management operation in accordance with the set first color verification setting and the set second color verification setting.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12B depicts a view for explaining databases provided in the color management system according to the first embodiment;

FIG. 13 depicts a view showing an example of the TOP screen of a site management application according to the first embodiment;

FIG. 14 depicts a view showing an example of the environment setting screen of a color management application;

FIG. 17 depicts a view showing an example of a reference editing screen in the environment setting of the site management application according to the first embodiment;

FIG. 24 depicts a view showing an example of the color verification result screen of the site management application;

FIG. 29 depicts a view for explaining a determination criterion database according to the second embodiment;

FIG. 32 depicts a view showing an example of a color verification result screen displayed by a site management application according to the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
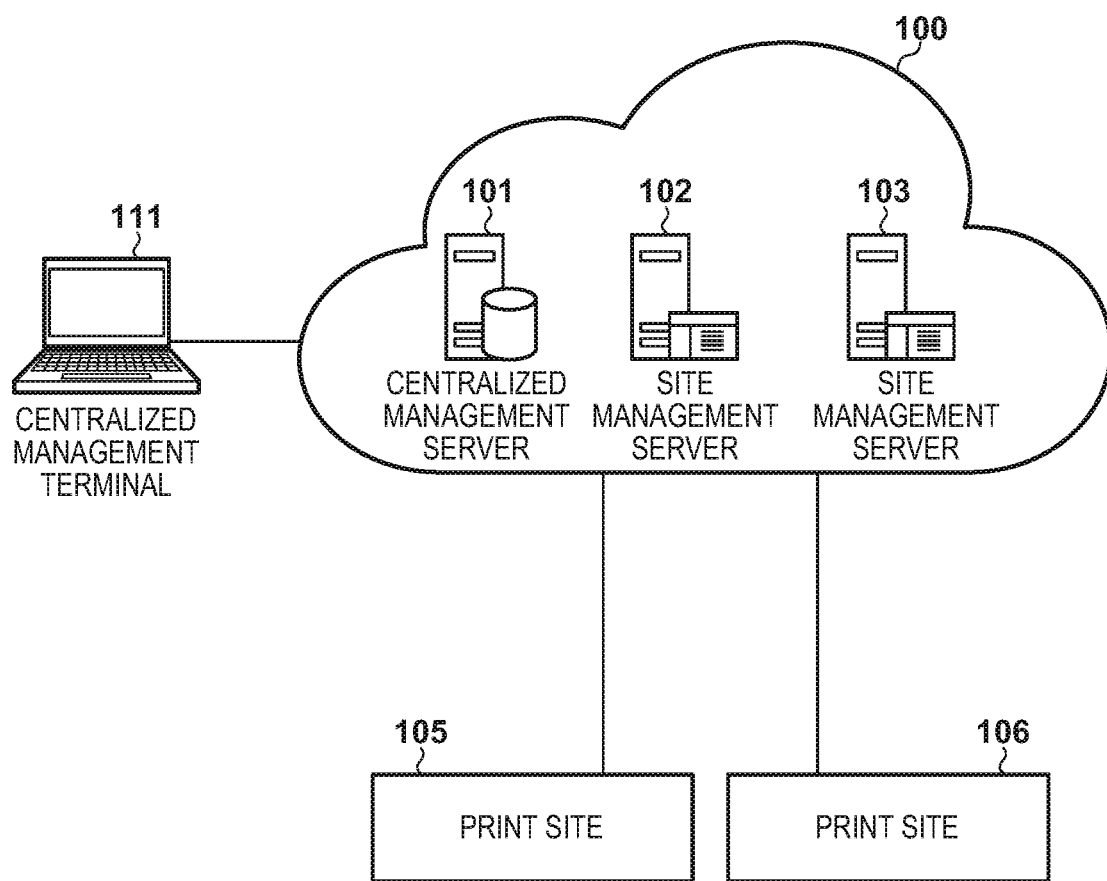
FIG. 1 is a schematic diagram for explaining the overall arrangement of a printing system according to the first embodiment of the present invention.

FIG. 1 is a schematic diagram for explaining the overall arrangement of a printing system according to the first embodiment of the present invention. Here, a print site 105 and a print site 106 exist under the management of a centralized management site that manages all sites existing at different locations. In the first embodiment, an example in which at least one printing apparatus operates in each print site is used. However, the present invention is not limited to this. A system arrangement including more print sites under the management of the centralized management site may be used.

Figure 2:
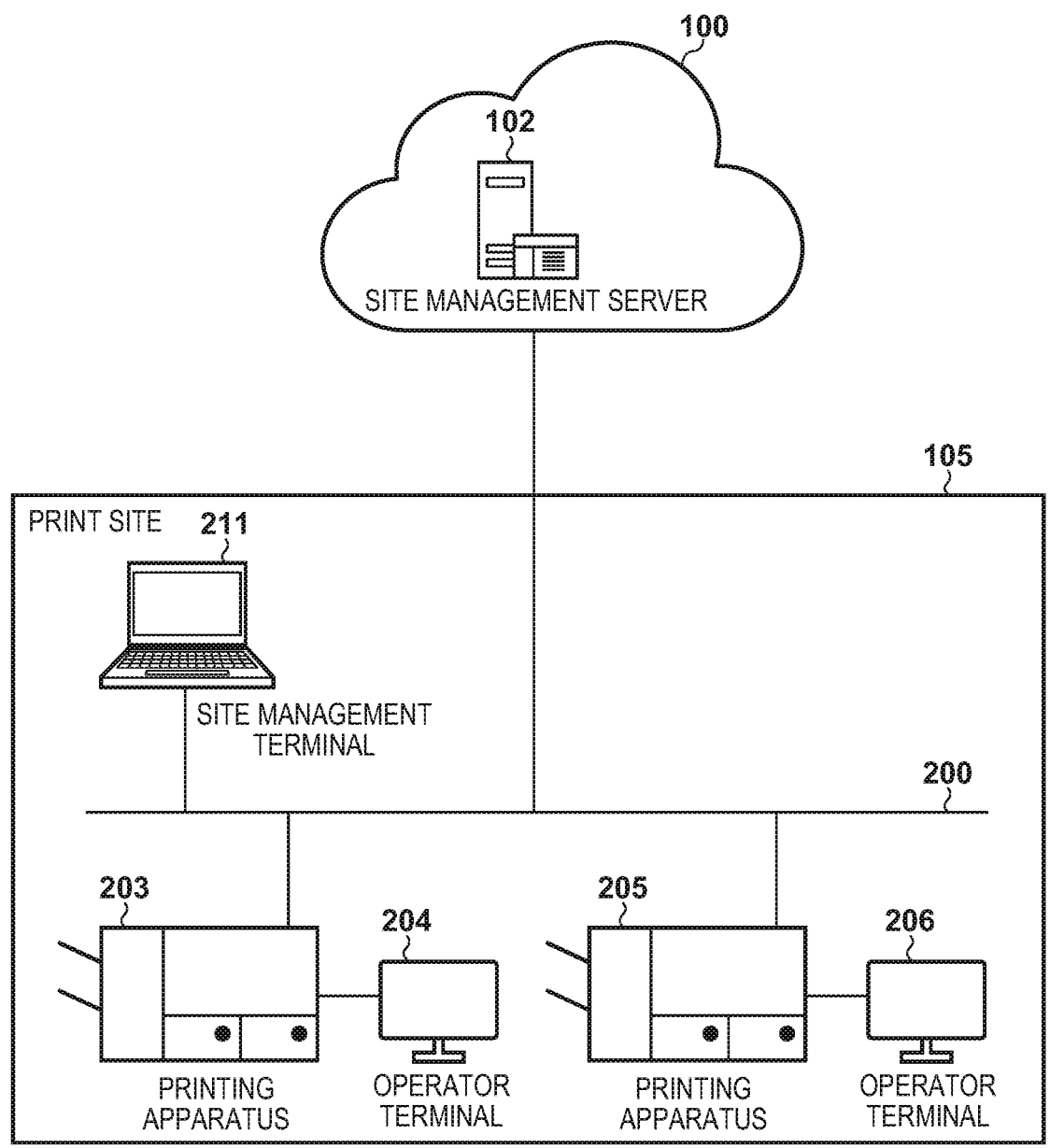
FIG. 2 depicts a view for explaining an arrangement centering around a print site of the printing system according to the first embodiment.

FIG. 2 depicts a view for explaining an arrangement centering around the print site 105 of the printing system according to the first embodiment.

A cloud environment 100 includes cloud servers such as site management servers 102 and 103 and a centralized management server 101 to be described later, and provides various kinds of services to terminal apparatuses connected via the Internet. Note that in the first embodiment, a description will be made assuming that the site management servers 102 and 103 and the centralized management server 101 are cloud servers. However, the present invention is not limited to this. The centralized management server 101 and the site management servers 102 and 103 may be installed in each of the print site 105 and a site to perform a centralized management operation and used on-premises.

The site management server 102 is a server that manages printing apparatuses 203 and 205 operating in the print site 105. The site management server 102 obtains the information of the printing apparatuses 203 and 205 as the management targets. In addition, the site management server 102 transmits various kinds of control instructions to the printing apparatuses 203 and 205 in the management target site. Furthermore, the site management server 102 transmits information concerning the printing apparatuses operating in the management target site to the centralized management server 101 to be described later. Note that the site management server 103 (FIG. 1) is a server that manages printing apparatuses operating in the print site 106. Since the operation is the same as that of the site management server 102, the following description will be made concerning only the site management server 102.

Note that the site management server 102 is a cloud server installed in the cloud environment 100, and is connected to a site management terminal 211 to be described later or the centralized management server 101 via the Internet. The centralized management server 101 is a server that integrally manages information of at least one print site 105. The centralized management server 101 obtains the information of each print site from the site management server 102. The information includes, for example, the operation rates of the printing apparatuses 203 and 205 of the management targets or the life estimating information of each part of the printing apparatuses 203 and 205. In addition, the centralized management server 101 transmits the above-described print site information (the information concerning the printing apparatuses operating in the print site) to a centralized management terminal 111.

Note that the centralized management server 101 is a cloud server installed in the cloud environment 100 and is connected to the site management server 102 and the centralized management terminal 111 via the Internet. The centralized management terminal 111 is a terminal used by a centralized manager who works in the centralized management site. The centralized management terminal 111 displays print site information received from the centralized management server 101 on a display unit (not shown). The centralized manager refers to the print site information displayed on the display unit and verifies the operation rates of the printing apparatuses 203 and 205 of the print site and the cost of consumables.

A site management terminal 211 is a terminal (information processing apparatus) used by a color expert who manages the print site 105. The site management terminal 211 communicates with the site management server 102 and displays the information of the printing apparatuses 203 and 205 in the site on a display unit (not shown). The color expert refers to the pieces of displayed information of the printing apparatuses 203 and 205 and uses them for a color management operation. The color management operation is an operation executed to keep the colors of an image printed by a printing apparatus to the desired quality standard of color, and includes a plurality of steps. Examples are a verification operation (color verification operation) of the color values of an image printed by a printing apparatus, and a color adjustment operation of performing adjustment such that the color values of a printed image satisfy a quality standard of color. In addition, the site management terminal 211 receives an instruction from the color expert and transmits various kinds of execution instructions to the printing apparatuses 203 and 205 in the print site 105.

The printing apparatuses 203 and 205 are printing apparatuses operating in the print site 105. The printing apparatuses 203 and 205 are, for example, electrophotographic printers or inkjet printers. The printing apparatuses 203 and 205 may each have an arrangement formed by connecting another apparatus to a printer. For example, a sheet feeder configured to expand the feeding capability or a post processing apparatus configured to perform various kinds of post processing for a sheet discharged from the printing apparatus is connected. In some cases, a print server (not shown) is connected to expand the printing capability.

Operator terminals 204 and 206 are apparatuses used by the operators of the printing apparatuses to perform various kinds of operations when using the printing apparatuses 203 and 205. The various kinds of operations are, for example, setting of the information of sheets stored in the feeder, and an execution instruction of the adjustment function of the printing apparatus. In the first embodiment, console units provided on the printing apparatuses 203 and 205 will be described as the operator terminals 204 and 206. However, the present invention is not limited to this. In an arrangement formed by connecting the above-described print server, the input/output device of the print server may be used as the operator terminal. An intra-site network 200 connects the terminals in the print site 105 with each other and also connects each apparatus to an external network.

The hardware arrangements of various kinds of apparatuses according to the first embodiment will be described next.

Figure 3:
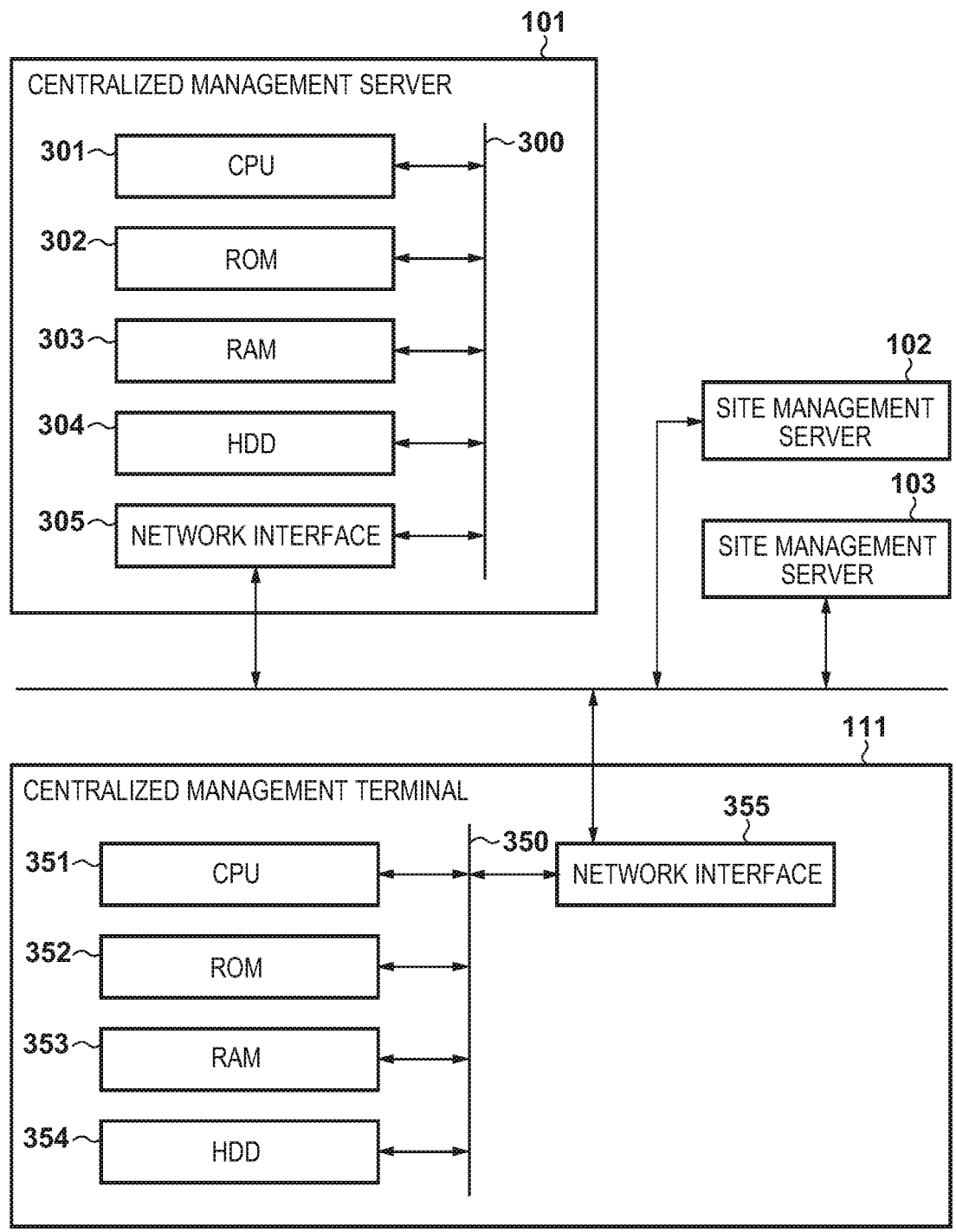
FIG. 3 is a block diagram for explaining a hardware arrangement including the centralized management server and the centralized management terminal of a centralized management system according to the first embodiment.

FIG. 3 is a block diagram for explaining a hardware arrangement including the centralized management server 101 and the centralized management terminal 111 of the centralized management system according to the first embodiment.

The hardware arrangement of the centralized management server 101 will be described first.

A CPU 301 deploys a control program stored in a ROM 302 or a hard disk (HDD) 304 into a RAM 303 and executes the deployed program, thereby generally controlling access to various kinds of devices connected to a system bus 300. The ROM 302 stores the control program executable by the CPU 301, and the like. The RAM 303 is configured to mainly function as the main memory or work area of the CPU 301 and expand the memory capacity by an optional RAM connected to an expansion port (not shown). The hard disk (HDD) 304 stores a boot program, various kinds of applications, font data, a user file, an editing file, and the like. Note that although the HDD 304 is used in the first embodiment, an SD card, a flash memory, or the like may be used as an external storage device, in addition to the HDD 304. A network interface 305 performs data communication with the centralized management terminal 111 or the site management server 102 (the site management servers 102 and 103 in FIG. 3) via a network.

The hardware arrangement of the centralized management terminal 111 will be described next.

A CPU 351 deploys a control program stored in a ROM 352 or a hard disk (HDD) 354 into a RAM 353 and executes the deployed program, thereby generally controlling access to various kinds of devices connected to a system bus 350. The ROM 352 stores the control program executable by the CPU 351, and the like. The RAM 353 is configured to mainly function as the main memory or work area of the CPU 351 and expand the memory capacity by an optional RAM connected to an expansion port (not shown). The hard disk (HDD) 354 stores a boot program, various kinds of applications, font data, a user file, an editing file, and the like. Note that although the HDD 354 is used in the first embodiment, an SD card, a flash memory, or the like may be used as an external storage device, in addition to the HDD 354. A network interface 355 performs data communication with the centralized management server 101 via a network.

Figure 4:
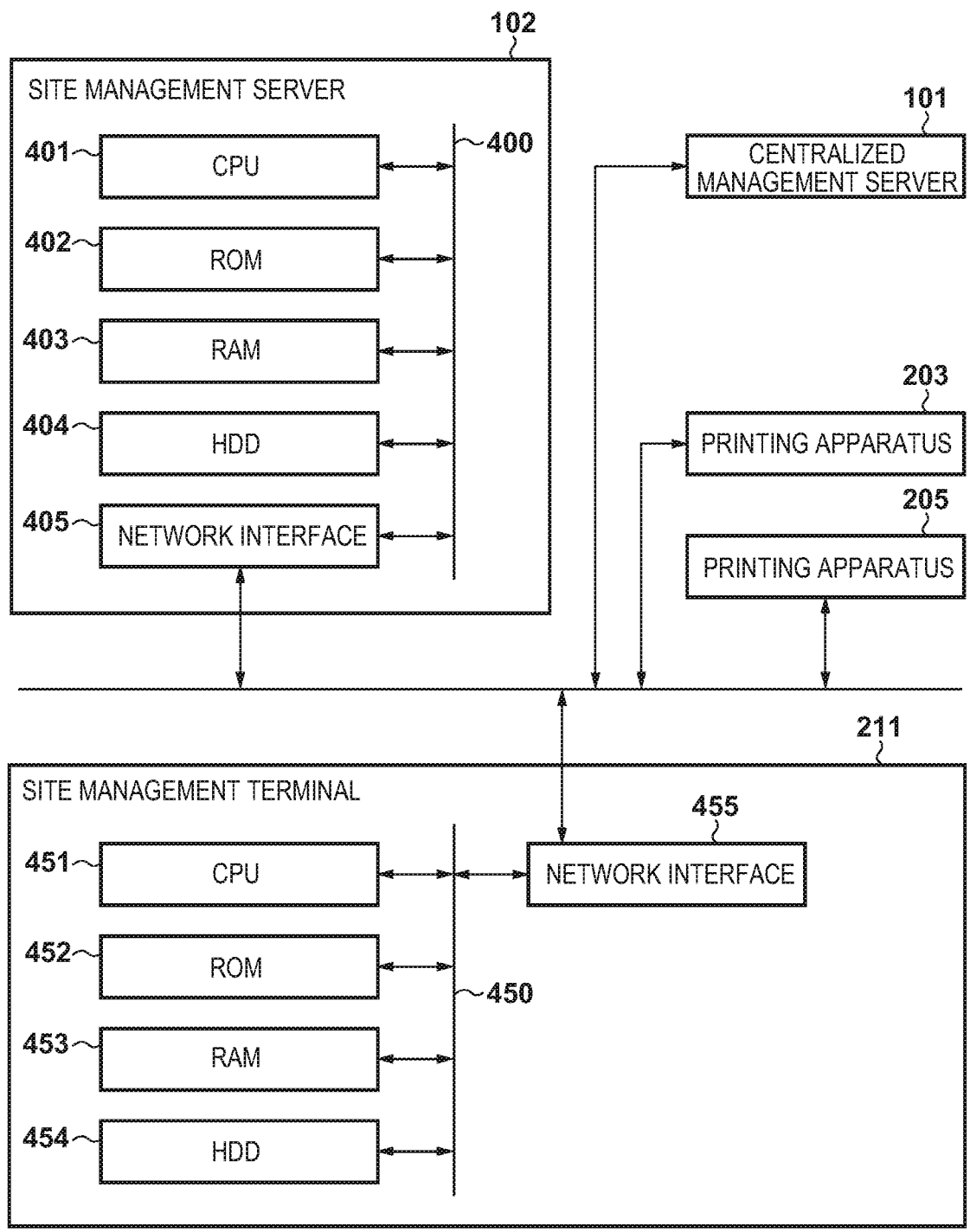
FIG. 4 is a block diagram for explaining a hardware arrangement including the site management server and the site management terminal of the centralized management system according to the first embodiment.

FIG. 4 is a block diagram for explaining a hardware arrangement including the site management server 102 and the site management terminal 211 of the centralized management system according to the first embodiment.

The hardware arrangement of the site management server 102 will be described first.

A CPU 401 deploys a control program stored in a ROM 402 or a hard disk (HDD) 404 into a RAM 403 and executes the deployed program, thereby generally controlling access to various kinds of devices connected to a system bus 400. The ROM 402 stores the control program executable by the CPU 401, and the like. The RAM 403 is configured to mainly function as the main memory or work area of the CPU 401 and expand the memory capacity by an optional RAM connected to an expansion port (not shown). The hard disk (HDD) 404 stores a boot program, various kinds of applications, font data, a user file, an editing file, and the like. Note that although the HDD 404 is used in the first embodiment, an SD card, a flash memory, or the like may be used as an external storage device, in addition to the HDD 404. A network interface 405 performs data communication with the centralized management server 101, the site management terminal 211, and the printing apparatuses 203 and 205 via a network.

The hardware arrangement of the site management terminal 211 will be described next.

A CPU 451 deploys a control program stored in a ROM 452 or a hard disk (HDD) 454 into a RAM 453 and executes the deployed program, thereby generally controlling access to various kinds of devices connected to a system bus 450. The ROM 452 stores the control program executable by the CPU 451, and the like. The RAM 453 is configured to mainly function as the main memory or work area of the CPU 451 and expand the memory capacity by an optional RAM connected to an expansion port (not shown). The hard disk (HDD) 454 stores a boot program, various kinds of applications, font data, a user file, an editing file, and the like. Note that although the HDD 454 is used in the first embodiment, an SD card, a flash memory, or the like may be used as an external storage device, in addition to the HDD 454. A network interface 455 performs data communication with the site management server 102 via a network.

Figure 5:
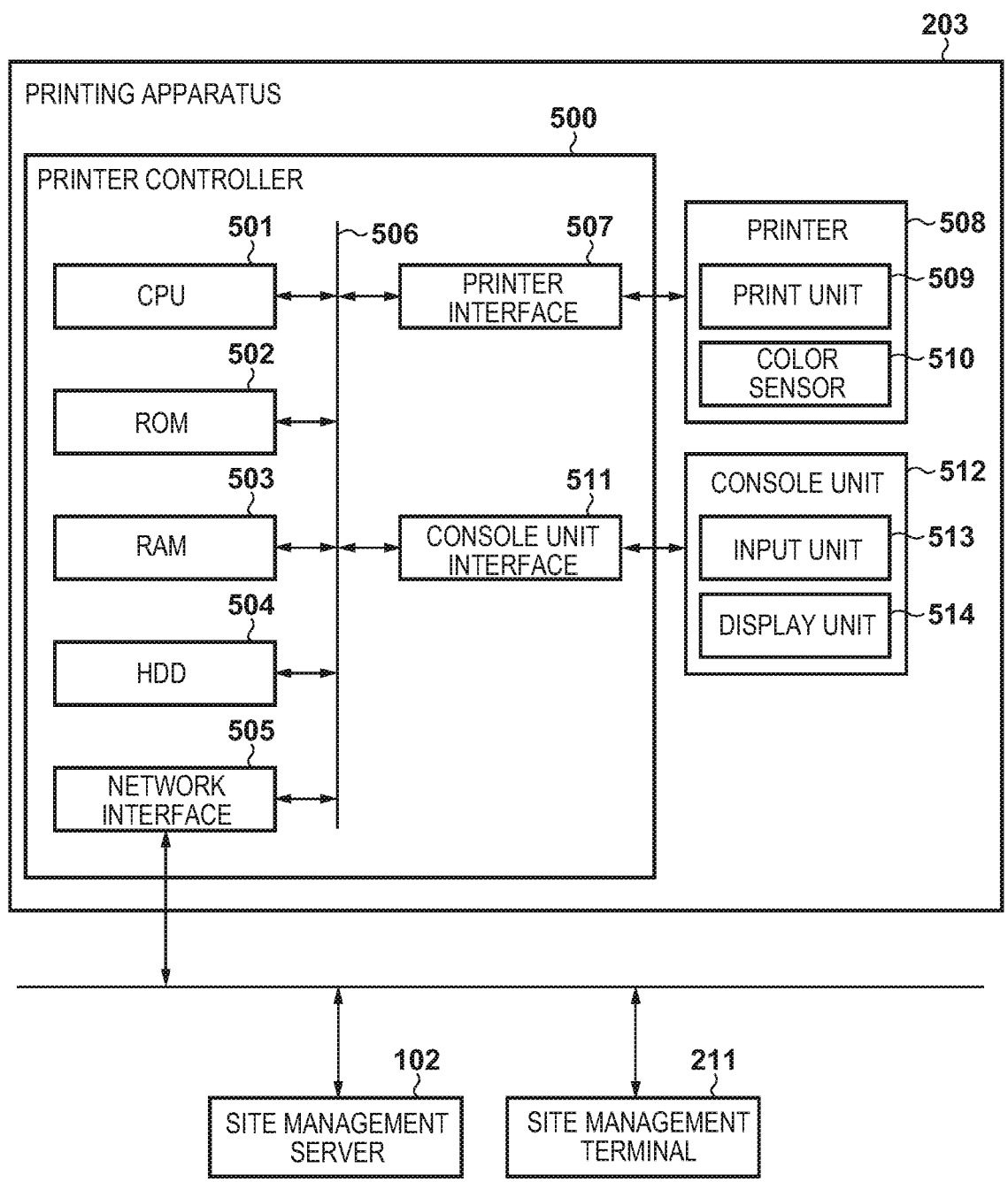
FIG. 5 is a block diagram for explaining the hardware arrangement of a printing apparatus according to the first embodiment.

FIG. 5 is a block diagram for explaining the hardware arrangement of the printing apparatus 203 according to the first embodiment. Note that the printing apparatus 205 has the same arrangement, and a description thereof will be omitted. The following description will be made using the printing apparatus 203 as an example, and the same applies to the printing apparatus 205.

A printer controller 500 is a controller of the printing apparatus 203 and performs processing necessary for execution of print processing, such as analysis of an entered print job and rendering processing to image data. Note that the following description will be made using an example in which the processing necessary for printing is performed by the printer controller 500 of the printing apparatus 203. However, the present invention is not limited to this. A form in which a print server (not shown) connected to the printing apparatus 203 performs processing such as reception and analysis of a print job and rendering to image data may also be employed. In this case, the print server transmits the image data after rendering and various kinds of data necessary for print processing to the printing apparatus 203. The printing apparatus 203 executes print processing by a printer 508 using the data received from the print server. A CPU 501 deploys a control program stored in a ROM 502 or a hard disk (HDD) 504 into a RAM 503 and executes the deployed program, thereby generally controlling access to various kinds of devices connected to a system bus 506. The ROM 502 stores the control program executable by the CPU 501, and the like. The RAM 503 is configured to mainly function as the main memory or work area of the CPU 501 and expand the memory capacity by an optional RAM connected to an expansion port (not shown). The hard disk (HDD) 504 stores a boot program, various kinds of applications, font data, a user file, an editing file, and the like. Note that although the HDD 504 is used in the first embodiment, an SD card, a flash memory, or the like may be used as an external storage device, in addition to the HDD 504. A network interface 505 performs data communication with the site management server 102 or the site management terminal 211 via a network. A printer interface 507 controls image output to the printer 508. In addition, the printer interface 507 controls a color sensor 510 provided in the printer 508 and receives a measured result. The printer 508 includes at least an image forming unit (print unit) 509 that performs a print operation, and the color sensor 510 that measures the colors of a printed product. In addition, a feeder and a post processing apparatus (neither are shown) may be connected.

In the first embodiment, the color sensor 510 is installed on a sheet conveyance path in the printing apparatus 203. At least one color sensor 510 is arranged between the fixing unit and the discharge port of the print unit 509. The color sensor 510 can measure the colors of an image transferred/fixed onto a sheet. Data obtained by the colorimetric measurement of the color sensor 510 are, for example, a spectral value, a chromatic value, and a density. A chart image printed by the print unit 509 is measured using the color sensor 510, and a correction table is generated using the difference between the measured result and a target value. This will save the user from installing a chart image on a sensor to measure the chart image. For this reason, when the color sensor 510 is used, calibration can be executed automatically. A console unit interface 511 controls display on a display unit 514 provided on a console unit 512, and input of various kinds of information which an input unit 513 receives from the operator. As described above, in the first embodiment, the console unit 512 has the same meaning as the operator terminals 204 and 206.

The software configurations of various kinds of apparatuses according to the first embodiment will be described next.

Figure 6A:
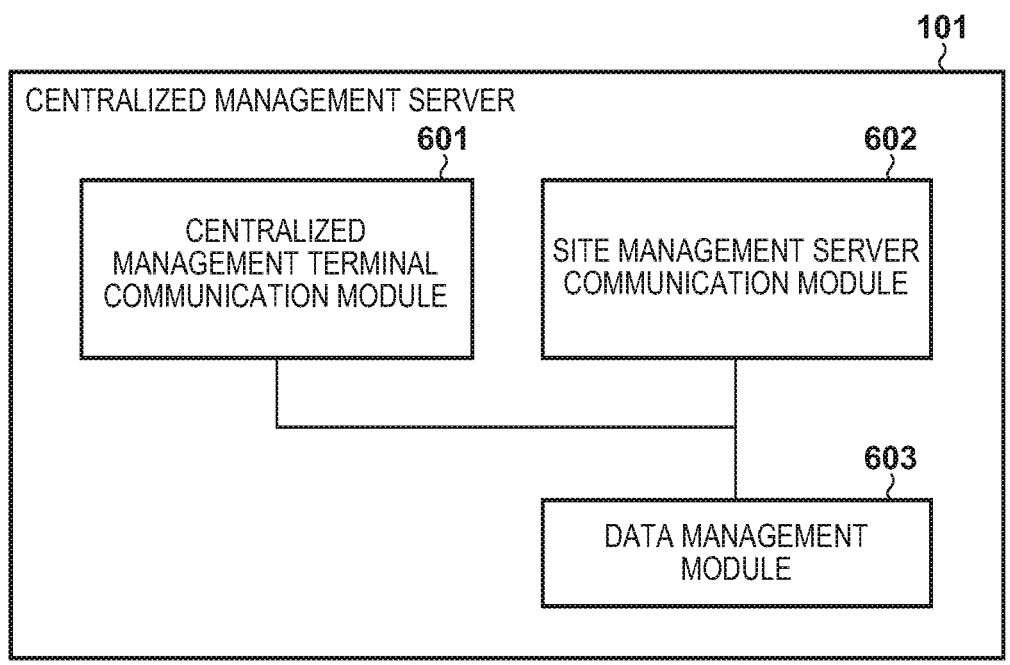
FIG. 6A is a block diagram for explaining the software configuration of the centralized management server according to the first embodiment.

FIG. 6A is a block diagram for explaining the software configuration of the centralized management server 101 according to the first embodiment. These software modules are stored as programs in the HDD 304 and implemented when the CPU 301 deploys the programs into the RAM 303 and executes them.

A centralized management terminal communication module 601 performs data communication with the centralized management terminal 111. For example, data for a centralized management application operating on the centralized management terminal 111 is generated and transmitted to the centralized management terminal 111. In addition, the centralized management terminal communication module 601 receives various kinds of instructions accepted from the centralized manager by the centralized management application.

A site management server communication module 602 executes data communication with another apparatus and obtains the information of the print site 105 of the color management target. For example, the site management server communication module 602 obtains the color state information of the printing apparatuses 203 and 205 in the print site 105. The color state information includes the measured value of an image printed by a printing apparatus, the color difference between the measured value and a target value, a result of determining whether the color difference is less than a threshold, and the measuring condition (profile) to perform colorimetric measurement. In addition, the site management server communication module 602 transmits various kinds of control instructions to the site management server 102 in accordance with an instruction accepted from the centralized manager by the centralized management application. For example, the site management server 102 instructs to change a notification interval concerning a periodical notification of the color state information for each printing apparatus from the site management server 102 to the centralized management server 101. A data management module 603 executes saving and management of various kinds of data concerning centralized management processing. For example, data such as the color state information of the print site 105, which is obtained by the site management server communication module 602, is stored. In addition, various kinds of content data to be distributed to the centralized management terminal 111 to execute the centralized management application are stored.

Figure 6B:
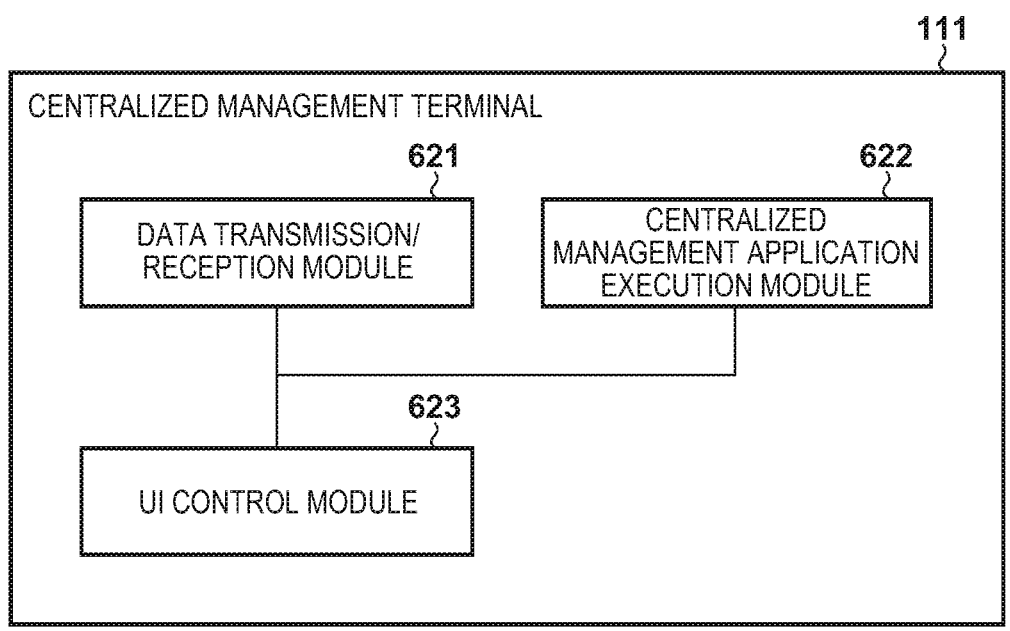
FIG. 6B is a block diagram for explaining the software configuration of the centralized management terminal.

FIG. 6B is a block diagram showing the software configuration of the centralized management terminal 111 according to the first embodiment. These software modules are stored as programs in an HDD 354 and implemented when a CPU 351 deploys the programs into a RAM 353 and executes them.

A data transmission/reception module 621 performs data communication with the centralized management server 101. For example, the data transmission/reception module 621 receives various kinds of content data to be displayed by the centralized management application from the centralized management server 101. In addition, the data transmission/reception module 621 transmits various kinds of instruction information accepted from the centralized manager on the centralized management application to the centralized management server 101. For example, the data transmission/reception module 621 transmits an instruction to obtain the color state information of each printing apparatus in the print site 105 under management. A centralized management application execution module 622 executes an application used by the centralized manager to manage the information of the print site 105 as the management target. A UI (user interface) control module 623 mainly executes processing concerning UI screen display of the centralized management application and acceptance of an input operation of the user.

Figure 7A:
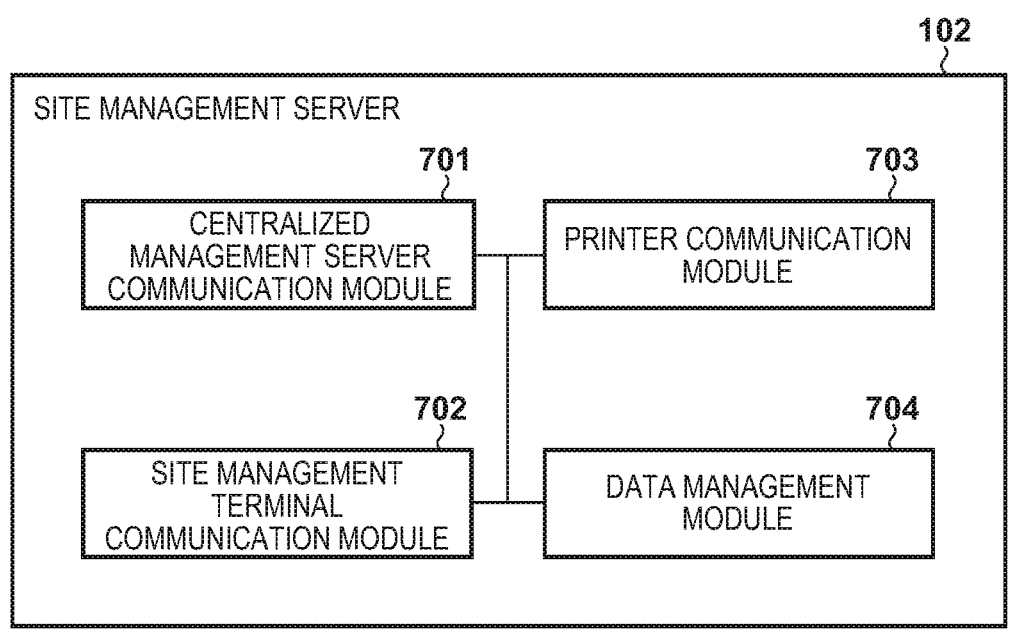
FIG. 7A is a block diagram for explaining the software configuration of the site management server according to the first embodiment.

FIG. 7A is a block diagram for explaining the software configuration of the site management server 102 according to the first embodiment. These software modules are stored as programs in the HDD 404 and implemented when the CPU 401 deploys the programs into the RAM 403 and executes them. Note that the site management server 103 has the same software configuration, and a description thereof will be omitted.

A centralized management server communication module 701 performs data communication with the centralized management server 101. For example, the centralized management server communication module 701 transmits various kinds of information of the print site 105 to the centralized management server 101. Alternatively, the centralized management server communication module 701 accepts an instruction from the centralized management server 101 and executes various kinds of control. A site management terminal communication module 702 performs data communication with the site management terminal 211. For example, the site management terminal communication module 702 generates data for a site management application operating on the site management terminal 211 and transmits it to the site management terminal 211. In addition, the site management terminal communication module 702 receives various kinds of instructions accepted from the color expert by the site management application. For example, the site management server communication module 702 receives an instruction for addition processing of the printing apparatus 203 of the management target or an execution instruction of color verification processing to the specific printing apparatus 203.

A printer communication module 703 performs data communication with the printing apparatus 203. For example, the printer communication module 703 transmits an execution instruction of color verification processing or color adjustment processing to the printing apparatus 203 in accordance with an instruction accepted from the color expert by the site management application. When color adjustment processing is instructed, the printer communication module 703 obtains, from the printing apparatus 203, result information of color adjustment processing executed by the printing apparatus 203. When color verification processing is instructed, the printer communication module 703 obtains data obtained by measuring a chart image by the printing apparatus 203 using the color sensor 510 and uses the data for determination control of color verification processing. A target value set in advance in a data management module 704 to be described later is compared with the received measured value to calculate a difference (color difference). Upon determining that the calculated difference is less than a threshold defined in advance, it is determined that the color of an image printed by the printing apparatus 203 satisfies a required quality standard of color. Satisfying the required quality standard of color means that the difference between the measured value of the color of the pointed image and the preset target value (reference) is small. Hence, the printer communication module 703 determines that the color value of the image printed by the printing apparatus currently satisfies the quality standard of color, and instructs to record the color verification processing result in the data management module 704 and display the result on a UI control module 723 to be described later. On the other hand, upon determining that the difference is equal to or more than the threshold, it is determined that the color of the image printed by the printing apparatus 203 does not satisfy the quality standard of color. In this case, the printer communication module 703 transmits a recovery processing setting for color verification processing to the printing apparatus 203. For example, as the recovery processing, the printing apparatus 203 automatically executes color adjustment processing (calibration). Furthermore, after completion of color adjustment processing, the printer communication module 703 re-executes color verification processing.

The data management module 704 executes saving and management of various kinds of data concerning site management processing. For example, the data management module 704 stores the data of the printing apparatus 203 obtained by the printer communication module 703. In addition, the data management module 704 stores various kinds of content data to be distributed to the site management terminal 211 to execute the site management application. Furthermore, the data management module 704 saves and manages setting information, target value information, and the like associated with color verification processing or color adjustment processing.

Figure 7B:
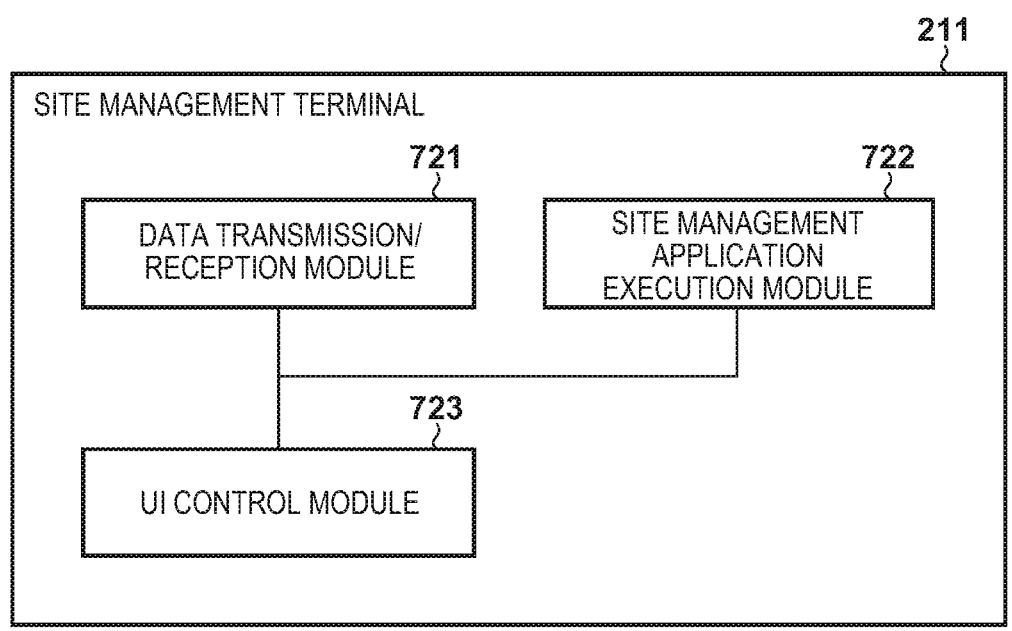
FIG. 7B is a block diagram for explaining the software configuration of the site management terminal.

FIG. 7B is a block diagram for explaining the software configuration of the site management terminal 211 according to the first embodiment. These software modules are stored as programs in an HDD 454 and implemented when a CPU 451 deploys the programs into a RAM 453 and executes them.

A data transmission/reception module 721 performs data communication with the site management server 102. For example, the data transmission/reception module 721 receives various kinds of content data to be displayed by the site management application from the site management server 102. In addition, the data transmission/reception module 721 transmits various kinds of instruction information accepted from the color expert on the site management application to the site management server 102. For example, an instruction for addition processing of the printing apparatus 203 of the management target or an execution instruction of color verification processing to the specific printing apparatus 203 is transmitted.

A site management application execution module 722 executes an application used by the color expert to manage the printing apparatus 203 as the management target. The site management application execution module 722 obtains the information of the printing apparatus in the print site 105 from the site management server 102. In addition, the site management application execution module 722 transmits, to the site management server 102, various kinds of control instructions for the printing apparatus which are accepted from the color expert via a UI control module 723. The UI control module 723 mainly executes processing concerning UI screen display of the site management application and acceptance of an input operation of the user.

Figure 8:
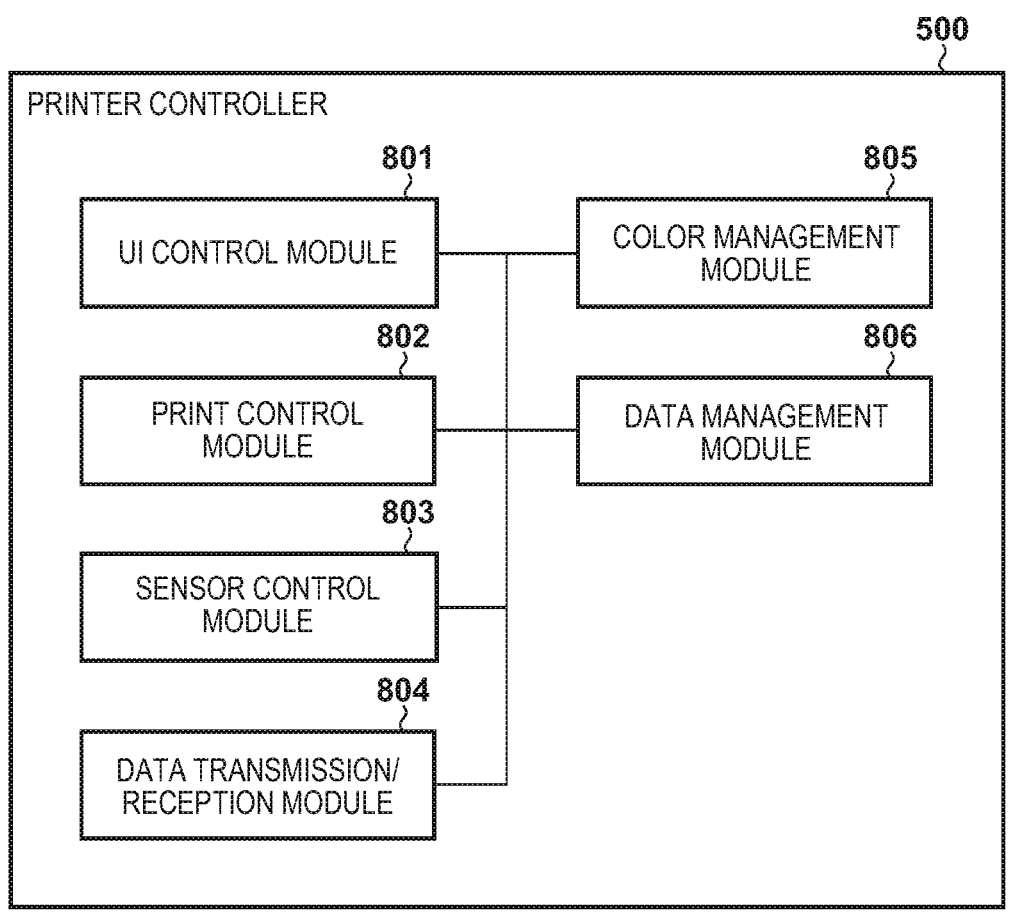
FIG. 8 is a block diagram for explaining the software configuration of the printer controller of the printing apparatus according to the first embodiment.

FIG. 8 is a block diagram for explaining the software configuration of the printer controller 500 of the printing apparatus 203 according to the first embodiment. These software modules are stored as programs in the HDD 504 and implemented when the CPU 501 deploys the programs into the RAM 503 and executes them. Note that the printing apparatus 205 has the same the software configuration, and a description thereof will be omitted.

A UI control module 801 controls display of the display unit 514 of the printing apparatus 203 and input from the input unit 513. A print control module 802 generates and manages print job data based on an execution instruction of a print job. For example, the print control module 802 performs processing necessary for print processing execution, such as analysis of a print job, rendering to image data, and image compression/decompression. In addition, the print control module 802 performs processing such as write/read to/from the HDD 504 concerning the generated print job and history management of printed jobs. A sensor control module 803 controls the above-described color sensor 510. The sensor control module 803 receives an instruction from the print control module 802, and executes colorimetric processing for a printed product such as a chart image to be used for calibration. The measured result is transmitted to a color management module 805 or a data management module 806 to be described later or to an external apparatus via a data transmission/reception module 804. The data transmission/reception module 804 manages data transmission/reception to/from the site management server 102. For example, the data transmission/reception module 804 transmits the information of a chart measured result or execution result of various kinds of functions of the printing apparatus 203 to the site management server 102. In addition, the data transmission/reception module 804 transmits/receives data concerning the output of a normal print job other than data concerning color management to/from an external apparatus. The color management module 805 controls processing for executing various kinds of functions configured to manage the quality of color that is the quality of a color of an image printed by the printing apparatus 203. More specifically, when the difference between a target value (reference) and the measured value of chart data for colorimetric measurement, which is printed by the printing apparatus 203, is equal to or less than a threshold, it is determined that the quality of color is satisfied. Management of the quality of color is performed.

An example of processing controlled by the color management module 805 will be described next.

Color verification processing is processing for verifying the quality of color of an image printed by the printing apparatus 203 at the timing of executing processing. When the start condition (verification execution condition) of color verification processing is satisfied, the color management module 805 of the printer controller 500 obtains chart data from the data management module 806. As for the color verification execution condition, for example, when printing of a predetermined value or more is executed, or when a predetermined time or more has elapsed from the previous color verification processing, it is determined that the color verification execution condition is satisfied. Then, the print control module 802 is instructed to print the chart data. Note that if measurement by the color sensor 510 is instructed for a chart image printed based on the chart data, the measurement instruction to the color sensor 510 is simultaneously transmitted to the print control module 802. However, the present invention is not limited to this, and may be applied to an embodiment in which the color management module 805 directly transmits the measurement instruction to the sensor control module 803. When the measured result of the printed chart image is obtained, the color management module 805 transmits the measured result to the site management server 102 via the data transmission/reception module 804. After the transmission, the color management module 805 receives a determination result using the measured result from the site management server 102. If the determination result is NG (indicates that the required quality standard of color is not satisfied), a recovery control instruction is received from the site management server 102 together with the determination result. The printer controller 500 controls each software module in accordance with the received instruction contents.

Note that in the first embodiment, a description will be made assuming that the determination processing using the measured result is executed by the site management server 102. However, the present invention is not limited to this, and the determination processing may be executed by the printing apparatus 203. In this case, the color management module 805 calculates the difference between the measured value and the target value set in advance in the data management module 806 and determines whether or not the difference is less than a threshold defined in advance (satisfies a required quality standard of color). If the determination result is NG (if the difference is equal to or more than the threshold), processing is performed in accordance with the recovery control instruction received next from the site management server 102.

Color adjustment processing will be described next. Color adjustment processing is a so-called known calibration function, and various types of functions are provided to optimize a plurality of factors that influence the quality of color. Color adjustment processing in a case of executing a gray scale correction function will be described below. In color adjustment processing, first, chart data is printed, and the measured result of the printed chart image is obtained. Printing of the chart data and control contents concerning the colorimetric measurement of the chart image are the same as in the above-described color verification processing, and a detailed description thereof will be omitted. A correction parameter used to eliminate the difference between the obtained measured result and a target value set in advance in the data management module 806 is calculated and recorded in the data management module 806. The correction parameter is applied when outputting a subsequent print job and printing an image.

The data management module 806 saves and manages data concerning management (color management) of the measured result of the color of an image printed by the printing apparatus 203. Examples of the data concerning color management are parameter data concerning color management applied to a print job, such as the setting information of color verification processing or color adjustment processing, a preset target value, a measured value, the execution log of each processing, a color profile, and an adjustment table. In addition, the data management module 806 saves and manages data other than the data concerning color management. For example, the data management module 806 handles the information of the device configuration and consumables of the printing apparatus 203.

The functions provided by the color management system according to the first embodiment will be described below.

Figure 9:
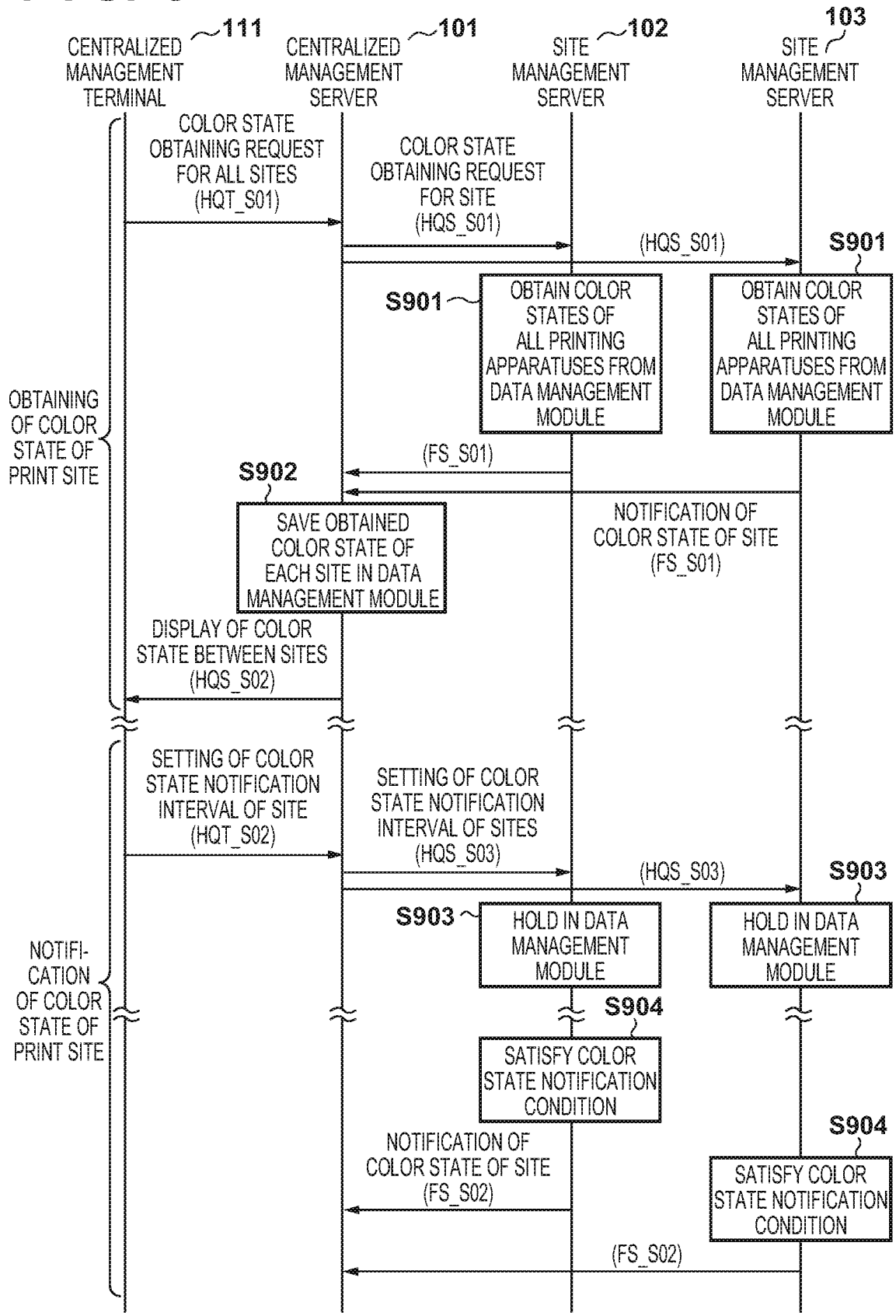
FIG. 9 is a sequence chart for explaining an example of a sequence concerning functions provided by a color management system according to the first embodiment.

FIG. 9 is a sequence chart for explaining an example of a sequence concerning the functions provided by the color management system according to the first embodiment.

<Function of Obtaining Color State Information of Print Site Based on Instruction of Centralized Manager>

Upon receiving an operation of the centralized manager, the centralized management terminal 111 requests the centralized management server 101 to obtain the color state information of printing apparatuses as the management targets installed in all print sites (HQT_S01). Upon receiving the request, the centralized management server 101 transmits the obtaining request of the color state information of the printing apparatuses as the management targets installed in the sites to the one or more site management servers 102 and 103 of the management targets (HQS S01). The site management servers 102 and 103 obtain the color state information of all printing apparatuses installed in the print sites as the management targets from the data management modules 704 of the site management servers 102 and 103 (step S901), and notify the centralized management server 101 of the color state information (FS_S01). The centralized management server 101 saves, in the data management module 603, the color state information of the sites notified by the site management servers 102 and 103 (step S902). In addition, the centralized management server 101 transmits the color state information of each site to the centralized management terminal 111, and causes the UI of the centralized management terminal 111 to display the color state information (HQS_S02).

<Notification of Color State Information of Print Site>

Upon receiving an operation of the centralized manager, the centralized management terminal 111 transmits, to the centralized management server 101, an instruction to set an interval of sending a notification about the color state information of an operating printing apparatus from a print site to each print site (HQT_S02). Upon receiving the instruction, the centralized management server 101 transmits, to the one or more site management servers 102 and 103 of the management targets, the instruction to set the interval of sending the notification about the color state information of a printing apparatus operating in each site (HQS_S03). The site management servers 102 and 103 store the setting information of the color state information notification interval received from the centralized management server 101 in the data management modules 704 of the site management servers 102 and 103 (step S903). After that, based on the setting information of the notification interval, the site management servers 102 and 103 detect that time has reached the timing of notifying the centralized management server 101 of the color state information of each printing apparatus operating in each site (the color state information notification condition is satisfied) (step S904). Every time it is detected that the printing apparatus color state information notification condition is satisfied, the site management servers 102 and 103 notify the centralized management server 101 of the color state information of the printing apparatus operating in the site (FS_S02).

Figure 10:
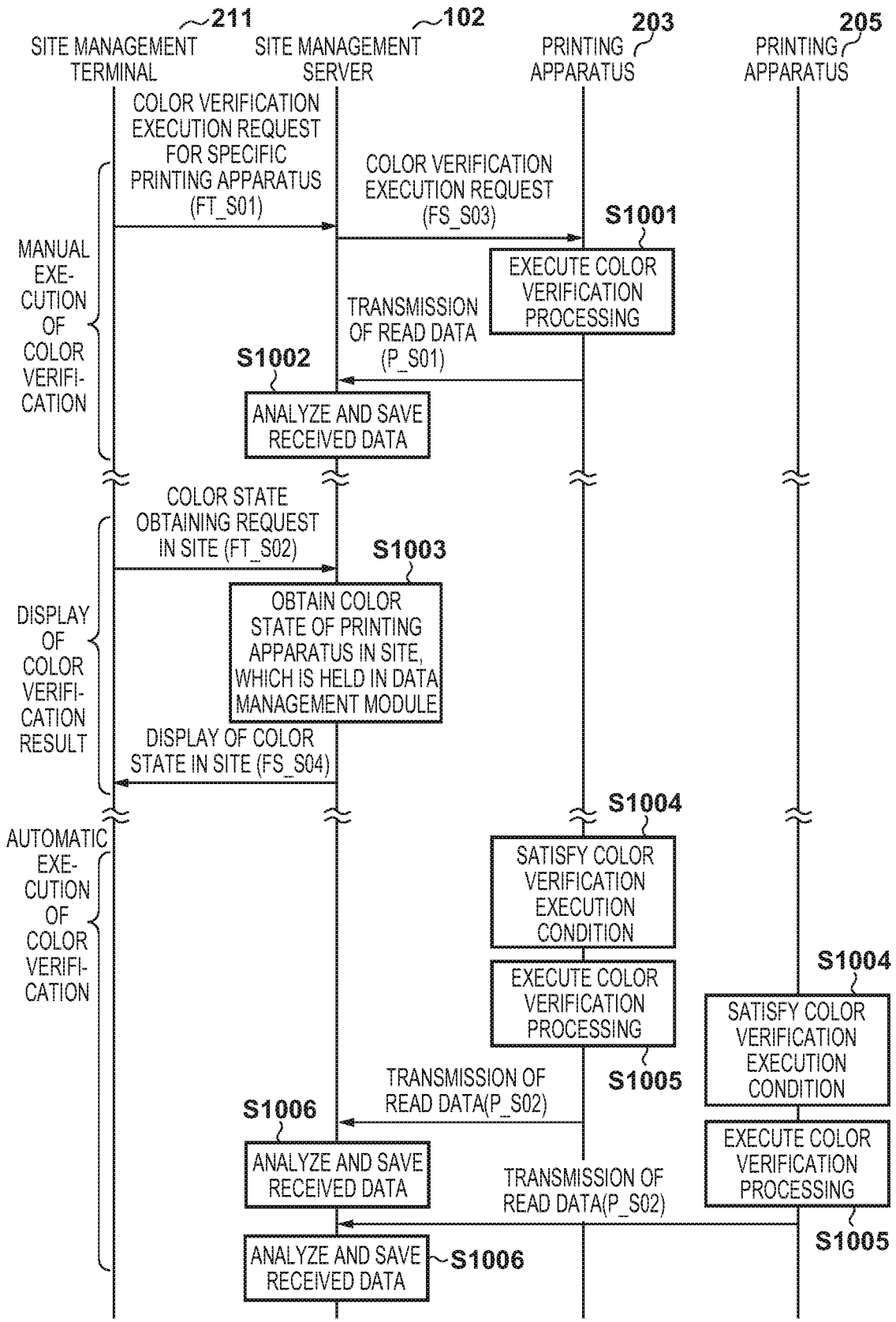
FIG. 10 is a sequence chart for explaining an example of a sequence concerning functions provided by the color management system according to the first embodiment.

FIG. 10 is a sequence chart for explaining an example of a sequence concerning functions provided by the color management system according to the first embodiment.

<Manual Execution of Color Verification Processing>

Upon receiving an operation of the color expert, the site management terminal 211 transmits an execution request of color verification processing of the specific printing apparatuses 203 and 205 to the site management server 102 (FT_S01). Here, assume that an execution request of color verification processing of the printing apparatus 203 is received. Detailed processing contents in the color verification processing have been described above. Upon receiving the request, the site management server 102 transmits the execution request of color verification processing to the printing apparatus 203 (FS_S03). Upon receiving the execution request, the printing apparatus 203 executes color verification processing (step S1001). The printing apparatus 203 transmits data (read data) representing the result of reading a chart image by the color sensor 510 to the site management server 102 (P_S01). The site management server 102 analyzes the read data received from the printing apparatus 203, and saves the analysis result in the data management module 704 of the site management server 102 (step S1002).

<Display of Color Verification Processing Result>

Upon receiving an operation of the color expert, the site management terminal 211 transmits an obtaining request of the color state information of each printing apparatus installed in the site to the site management server 102 (FT_S02). Upon receiving the request, the site management server 102 obtains the color state information of the printing apparatus 203 installed in the site, which is held in the data management module 704 (step S1003), transmits the color state information to the site management terminal 211, and causes the UI to display it (FS_S04).

<Automatic Execution of Color Verification Processing>

Upon detecting that a color verification execution condition to be described later is satisfied (step S1004), the one or more printing apparatuses 203 and 205 installed in the site execute color verification processing (step S1005). In this color verification processing, a printed chart image is read by the color sensor 510, and the read data is transmitted to the site management server 102 (P_S02). Upon receiving the read data from the printing apparatuses 203 and 205, the site management server 102 analyzes the data and saves the data in the data management module 704 of the site management server 102 (step S1006).

Figure 11:
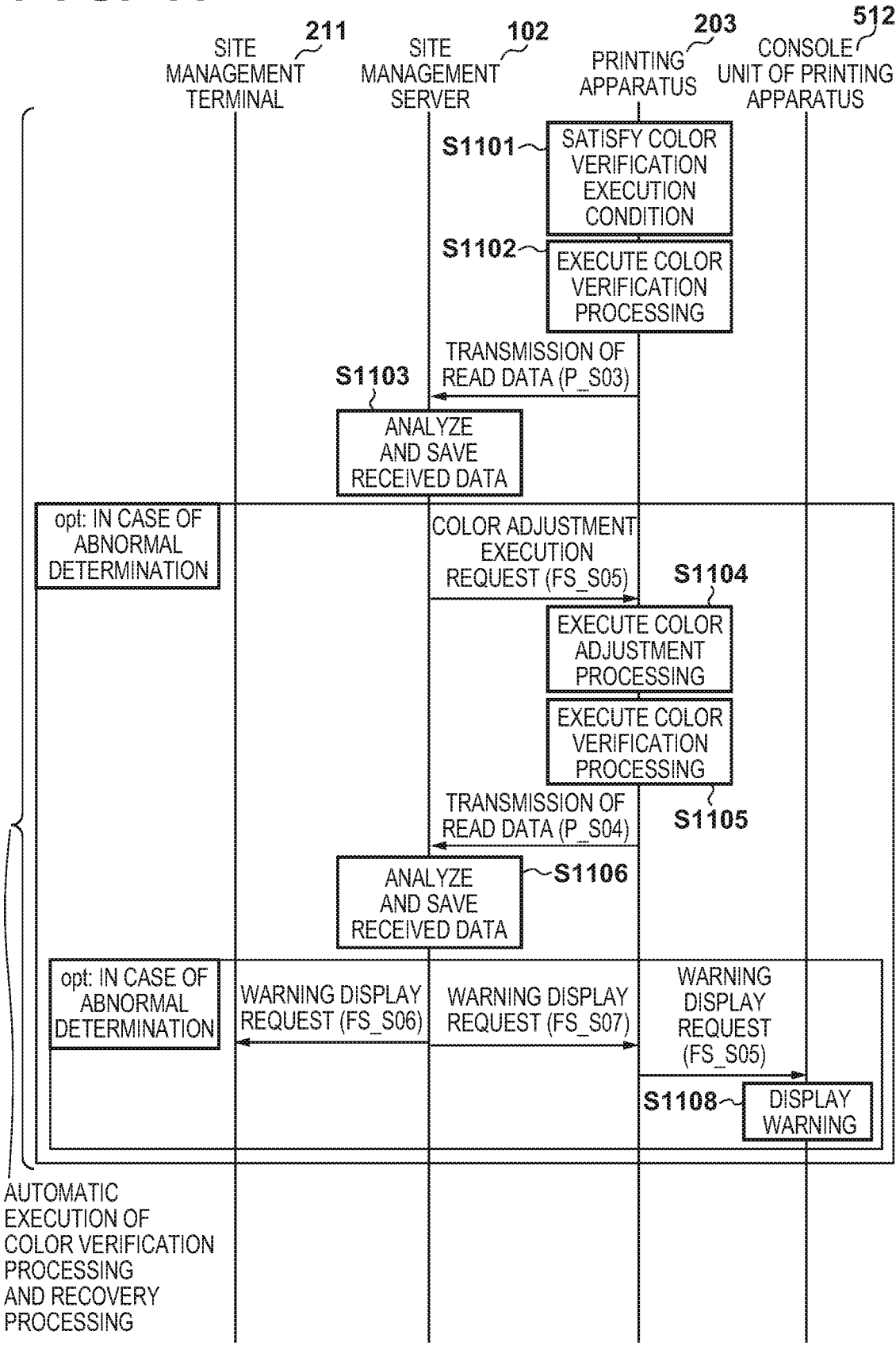
FIG. 11 is a sequence chart for explaining color verification processing provided by the color management system according to the first embodiment and an example of a sequence automatically executed by the system in accordance with a color verification result.

FIG. 11 is a sequence chart for explaining color verification processing provided by the color management system according to the first embodiment and an example of a sequence automatically executed by the system in accordance with a color verification result.

<Automatic Execution of Color Verification Processing and Recovery Processing>

The site management server 102 and the one or more printing apparatuses 203 and 205 in the print site perform control as shown in steps S1101 to S1103, like the control of automatic execution of color verification processing shown in FIG. 10. The site management server 102 analyzes data obtained by reading a chart image printed at the time of execution of color verification by the color sensor 510, and saves the data in the data management module 704. As the result of analysis of the read data, for example, if it is determined that the color value (color state) of an image printed by the printing apparatus 203 is not appropriate (does not satisfy a required quality standard of color), the site management server 102 requests the printing apparatus 203 to execute color adjustment (FS_S05). Upon receiving the request, the printing apparatus 203 executes color adjustment processing (step S1104). In addition, the printing apparatus 203 executes color verification processing anew after completion of color adjustment processing (step S1105), and transmits read data of the chart image by the color sensor 510 to the site management server 102 (P_S04). The site management server 102 analyzes the received read data again and saves it in the data management module 704 (step S1106). Here, as the result of analysis of the read data, if it is determined again that the color state of the printing apparatus 203 is not appropriate, the site management server 102 transmits a warning display request to the site management terminal 211 and the printing apparatus 203 (FS_S06 and FS_S07). The printing apparatus 203 displays a warning on the operator terminal 204 of the printing apparatus 203 in accordance with the warning display request (step S1108). Note that the control procedures of the site management server 102 and the printing apparatus 203 in this sequence will be described later in detail.

Functions other than the functions shown in the above sequence charts will be described below.

<Setting of Operating Information of Color Management Control for Printing Apparatus>

The site management server 102 distributes the operating information of color management control to the printing apparatuses 203 and 205 installed in the print site 105 of the management target. More specifically, the operating information of color management control is information necessary for executing color verification processing and color adjustment processing. The operating information of color verification processing includes, for example, the execution condition of color verification processing in the printing apparatuses 203 and 205, and the acceptance/rejection determination criterion for the result of color verification processing (the threshold of the color difference between the measured value and the target value), and the like. The operating information also includes the information of recovery processing of the printing apparatus in a case in which the color verification result is an error (the acceptance/rejection determination result for the verification result is "reject"). The operating information of color adjustment processing includes the patch arrangement of an adjustment chart, a colorimetric device, a chart print condition, and the like.

<Verification/Adjustment Processing in Printing Apparatus>

When the execution condition of color verification processing using the operating information is satisfied, color verification processing is executed. In addition, recovery processing such as color adjustment processing is executed in accordance with the result of color verification processing. Details of this processing will be described later. Note that the color verification processing and color adjustment processing need not be executed only when the execution condition of operating information distributed by the site management server 102 is satisfied. When the UI screen of the site management terminal 211 accepts the execution instructions of these processes from the color expert, the site management terminal 211 transmits the execution instructions to the printing apparatus 203 via the site management server 102. The printing apparatus 203 accepts the execution instructions and executes various kinds of processing. In addition, when the operator terminal 204 accepts the execution instructions of these processes from the operator, the printing apparatus 203 executes various kinds of processing in accordance with the execution instructions.

<Collection of Information of Printing Apparatuses 203 and 205 by Site Management Server 102>

The site management server 102 collects various kinds of information from the printing apparatuses 203 and 205 installed in the print site 105 of the management target. The information of the printing apparatuses 203 and 205 is, for example, color state information, and the execution history of color verification processing and the information of the execution results are obtained. In addition, as color adjustment processing information, the execution history information of color adjustment processing is obtained.

<Information Collection and Analysis by Site Management Server 102>

The site management server 102 processes the pieces of information obtained from the printing apparatuses 203 and 205 and generates data displayable on the UI screen of the site management terminal 211. The color expert accesses the site management server 102 from the site management terminal 211 and verifies the information of the printing apparatuses 203 and 205 on the UI screen of the site management application. By referring to the information displayed on the UI screen of the site management application, the color expert can unitarily grasp the color management states of the plurality of printing apparatuses 203 and 205 operating in the print site 105.

<Information Databases>

Details of information databases provided in the color management system according to the first embodiment will be described next with reference to FIGS. 12A to 12C.

Figure 12A:
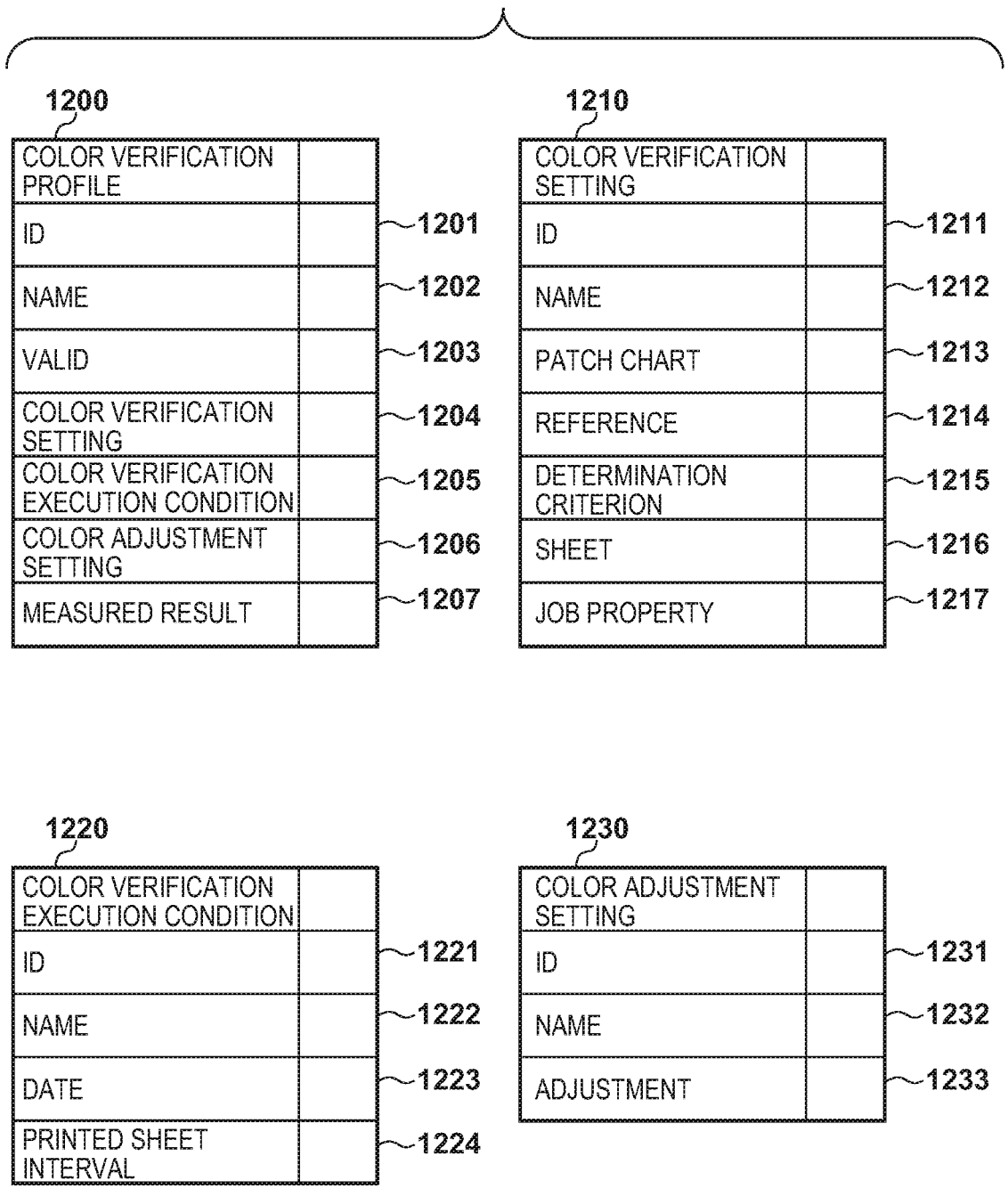
FIG. 12A depicts a view for explaining databases provided in the color management system according to the first embodiment.
Figure 12C:
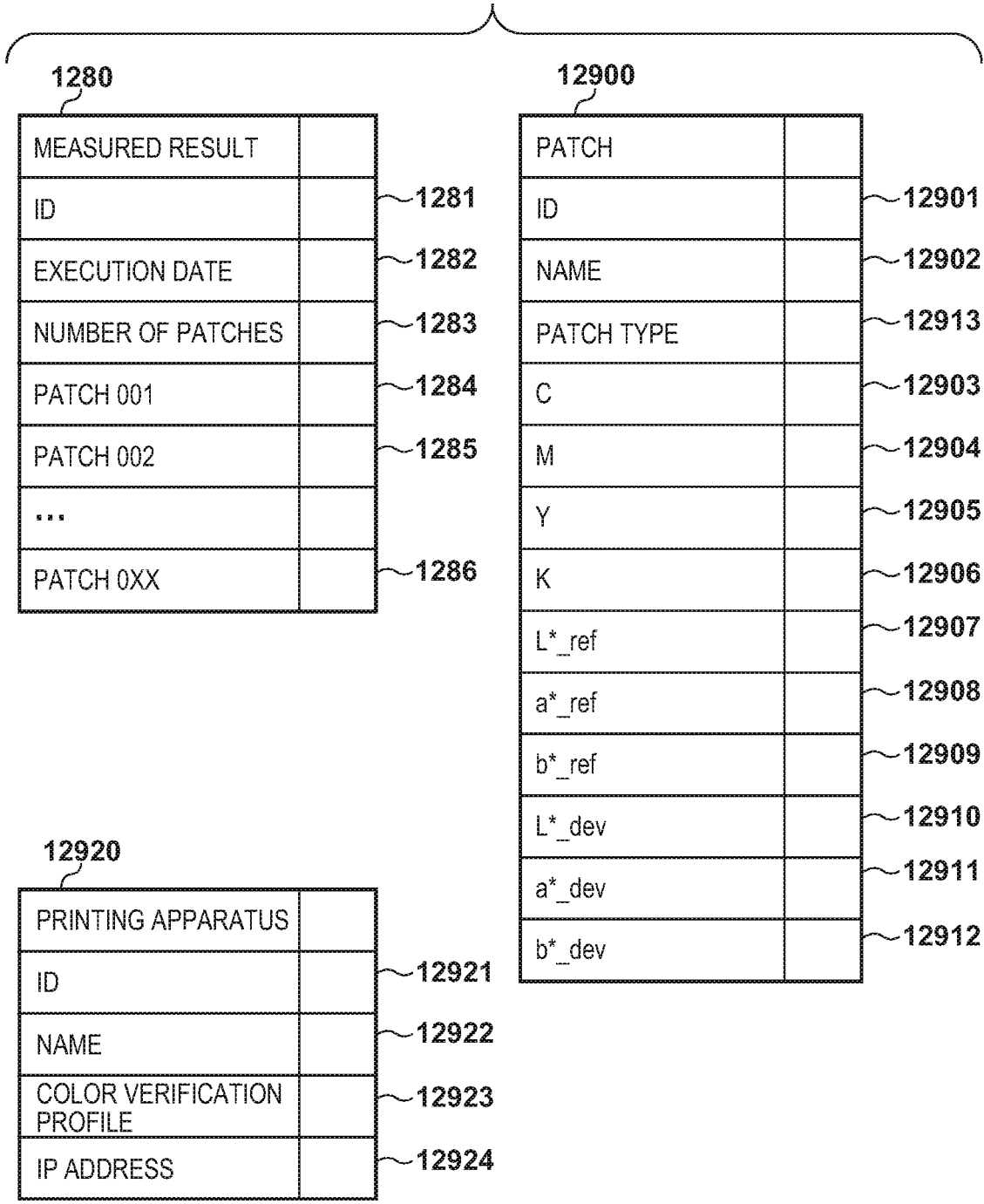
FIG. 12C depicts a view for explaining databases provided in the color management system according to the first embodiment.

FIGS. 12A to 12C depict views for explaining databases provided in the color management system according to the first embodiment.

Each of the databases is implemented when a program stored in the ROM 402 or the HDD 404 of the site management server 102 is deployed into the RAM 403 and executed by the CPU 401. The database is saved in the data management module 704 of the site management server 102. Each control module performs data updating and information transmission/reception to/from the centralized management server 101, the site management terminal 211, and the printing apparatuses 203 and 205, as needed. However, the saving location of the database is not limited to this and may be the data management module 603 of the centralized management server 101, or the data management module 806 of the printer controller 500 of the printing apparatus 203 or 205.

A color verification profile DB 1200 is a color verification profile DB (database) collecting information that should be set for performing the color management operation. The color verification profile DB 1200 is formed by an ID 1201 used to identify saved information, a name 1202 to be displayed on a UI to be described later, and following information. Valid 1203 is information representing whether the color management operation set in the color verification profile is valid. A color verification setting 1204 is link information to a color verification setting DB 1210 to be described later. A color verification execution condition 1205 is link information to a color verification execution condition DB 1220 to be described later. A color adjustment setting 1206 is link information to a color adjustment setting DB 1230 to be described later. A measured result 1207 is link information to a measured result DB 1280 (FIG. 12C) to be described later.

The color verification setting DB 1210 is a color verification setting DB collecting information that should be set for performing the color verification operation. The color verification setting DB 1210 includes an ID 1211 used to identify saved information, a name 1212 to be displayed on a UI to be described later, and following information. A patch chart 1213 is link information to a patch chart DB 1240 (FIG. 12B) to be described later. A reference 1214 is link information to a reference DB 1250 (FIG. 12B) to be described later. A determination criterion 1215 is link information to a determination criterion (threshold) DB 1260 (FIG. 12B) to be described later. A sheet 1216 is sheet information used when executing color verification processing. A job property 1217 is link information to a job property DB 1270 (FIG. 12B) to be described later.

The color verification execution condition DB 1220 is a color verification execution condition DB collecting execution condition information that should be set for performing the color verification operation. The color verification execution condition DB 1220 includes an ID 1221 used to identify saved information, a name 1222 to be displayed on a UI to be described later, and the following information. A date 1223 is the information of a date that is one of the conditions to execute the color verification operation set in the color verification setting 1204. A printed sheet interval 1224 is the information of a printed sheet interval that is similarly one of the conditions to execute the color verification operation.

The color adjustment setting DB 1230 is a color adjustment setting DB collecting execution condition information that should be set for performing the color adjustment operation. The color adjustment setting DB 1230 includes an ID 1231 used to identify saved information, a name 1232 to be displayed on a UI to be described later, and the following information. Adjustment 1233 is the information of a color adjustment operation. This is saved as information representing recovery processing to be executed when it is determined that the color adjustment operation is necessary as the result of the color verification operation. Recovery processing is, for example, calibration processing or profile creation processing. The color adjustment setting DB 1230 does not always save one color adjustment operation and may save a plurality of adjustment operations. Accordingly, information concerning the order to execute the plurality of adjustment operations may also be saved.

A patch chart DB 1240 shown in FIG. 12B is a patch chart DB collecting information that should be set for performing the color verification operation, and stores information concerning patch data used to print a chart image used in the color verification operation. The patch chart DB 1240 includes an ID 1241 used to identify saved information, a name 1242 to be displayed on a UI to be described later, and the following information. The number 1243 of patches is the number of patches to be printed in a patch chart. Reference numerals 1244 through 1246 denote pieces of link information to a patch DB 12900 (FIG. 12C) to be described later. Patch DBs as many as the number of patches designated by the number 1243 of patches are created and saved. A custom color flag 1247 represents whether or not a patch chart includes custom colors.

The reference DB 1250 is a reference DB collecting information that should be set for performing the color verification operation. The information is information concerning the target value in each patch, which is saved in a form corresponding to patch chart information designated by the reference DB 1250. The reference DB 1250 includes an ID 1251 used to identify saved information, a name 1252 to be displayed on a UI to be described later, and the following information. The number 1253 of patches is the number of patches to be printed in a patch chart. Reference numerals 1254 through 1256 denote pieces of link information to the patch DB 12900 to be described later. Patch DBs as many as the number of patches designated by the number 1253 of patches are created and saved.

The determination criterion DB 1260 is a determination criterion DB collecting information that should be set for performing the color verification operation. The information is information concerning determination items used when comparing a calculated measured result with a target value to determine whether or not the quality of color is satisfied in the color verification operation and the thresholds of the determination items. The determination criterion DB 1260 includes an ID 1261 used to identify saved information, a name 1262 to be displayed on a UI to be described later, and the following information. An average 1263 is the average of the difference amounts of all patches. A maximum 1264 is the maximum value in the difference amounts of all patches. Reference numeral 1265 denotes a value of a patch representing paper white; and numerals 1266 to 1269 respectively denote, values of single-color solid patches of cyan, magenta, yellow, and black. As for the determination criterion, in the first embodiment, the items 1263 through 1269 are used. However, the present invention is not limited to these items. Some of these items or a combination of items based on different indices may be used.

The job property DB 1270 is a job property DB collecting information that should be set for performing the color verification operation, and the information is information concerning the print settings of a patch chart to be printed in the color verification operation. The job property DB 1270 includes an ID 1271 used to identify saved information, a name 1272 to be displayed on a UI to be described later, and the following information. Items to be described from the job property DB 1270 include items of settings necessary for a print job used to print a patch chart by the printing apparatus 203. These items include an input profile 1273 that is an input color profile, an output profile 1274 that is an output color profile, a halftone 1275, and the like. The items are not limited to these items, as a matter of course. They are items set by the print control module 802 in the printing apparatus 203 and can be changed in accordance with the printing apparatus 203.

The measured result DB 1280 shown in FIG. 12C is a measured result DB collecting information concerning the measured result of the color verification operation. The information includes information concerning the measured values of patches printed and measured by the printing apparatuses 203 and 205. The measured result DB 1280 includes an ID 1281 used to identify saved information, and following information. An execution date 1282 is the information of an execution date in which the color verification operation is executed. The number 1283 of patches is the information of the number of patches to be printed in a patch chart. Reference numerals 1284 through 1286 denote pieces of link information to the patch DB 12900 to be described later. Patch DBs as many as the number of patches designated by the number 1283 of patches are created and saved.

The patch DB 12900 is a patch DB collecting information that should be set for performing the color verification operation. The patch DB 12900 includes an ID 12901 used to identify saved information, a name 12902 to be displayed on a UI to be described later, patch type information 12913 representing whether a patch has a custom color or a standard color, and the following information. Reference numerals 12903 to 12906 denote pieces of input signal information of patches and correspond to cyan, magenta, yellow, and black, respectively. Reference numerals 12907 to 12909 denote pieces of information concerning target values that are references described concerning the reference DB 1250. In the first embodiment, color state information as a target value will be described as the information of the CIE_L*a*b* color space used in general. Except that, any format is usable as long as the value allows the color verification operation to be performed. For example, the information of the CIE XYZ color space or the information of density may be used.

Reference numerals 12910 to 12912 respectively denote pieces of information concerning the measured result described concerning the measured result DB 1280. In the first embodiment, the pieces of information are described in the same CIE_L*a*b* format as the pieces of information 12907 to 12909. However, information of another format may be used. However, to calculate a difference, each measured result information is preferably held in the same format as the target value.

A printing apparatus DB 12920 is a printing apparatus DB collecting the information of the printing apparatus 203 for which color management is to be performed by the color expert using the site management application. The printing apparatus DB 12920 includes an ID 12921 used to identify saved information, a name 12922 to be displayed on a UI to be described later, and the following information. A color verification profile 12923 is link information to the color verification profile DB 1200 (FIG. 12A). An IP address 12924 is the information of the IP address of the printing apparatus 203. The items are not limited to these items, as a matter of course, and any information used to identify the printing apparatus 203 can be used.

<Site Management Application UI>

Details of the site management application executed by the site management terminal 211 of the color management system according to the first embodiment will be described next with reference to FIGS. 13 to 24. As described above, the site management application handles information necessary for the color expert to manage the printing apparatus. Only functions associated with color management will particularly be described here. UI screens to be explained here are generated/controlled by the site management application execution module 722 of the site management terminal 211 and displayed on a display unit (not shown) via the UI control module 723. The site management application also accepts an instruction from the color expert via the UI and a console unit (not shown).

FIG. 13 depicts a view showing an example of the TOP screen of the site management application according to the first embodiment.

The color expert presses each of an environment setting button 1301, a color management result verification button 1302, and a color management target device registration/deletion button 1303 via the screen to advance to the next screen, thereby executing a corresponding operation. In addition, by a message 1304, the color expert can know whether or not a problem has occurred in any one of the management target printing apparatuses. For example, if a printing apparatus for which the latest color management result of the color verification profile whose operation is valid exhibits a determination result error exists among the printing apparatuses 203 and 205 managed by the color expert, the information is displayed by the message 1304. The displayed information is not limited to the information shown in FIG. 13, and any other information that is saved in the data management module 704 of the site management server 102 and is useful for the color expert may be displayed.

FIG. 14 depicts a view showing an example of the environment setting screen of the color management application.

When the environment setting button 1301 is pressed in the screen shown in FIG. 13, the site management application execution module 722 generates the screen shown in FIG. 14, and the screen is displayed on the display unit (not shown) via the UI control module 723.

In an area 1401, the printing apparatus 203 (PRINTER 001) as the target of the environment setting is selectively displayed. The site management application execution module 722 inquires of the data management module 704, obtains the printing apparatus DB 12920 of the printing apparatus 203 registered by the color expert, and displays it. A color verification profile setting 1402 displays setting information to do a color verification profile setting. When the printing apparatus 203 is selected, the site management application execution module 722 inquires of the data management module 704. The site management application execution module 722 obtains the information of the color verification profile DB 1200 which is the same as that for the selected printing apparatus 203 from the printing apparatus DB 12920 and displays it as the color verification profile setting 1402.

Valid 1403 corresponds to the valid 1203 in the color verification profile DB 1200. If the color verification profile is valid, a state capable of showing the validity is displayed. Columns 1404 through 1406 display names corresponding to the color verification setting 1204 to the color adjustment setting 1206 in the color verification profile DB 1200, respectively, and saved in the setting DBs. The row of an arbitrary valid color verification profile is selected by the color expert, and a setting change and the like are performed for the selected color verification profile. An editing button 1407 is a button used to make a transition to a screen to do a color verification setting to be described later. An editing button 1408 is a button used to make a transition to a screen to set a color verification execution condition to be described later. An editing button 1409 is a button used to make a transition to a screen to do a color adjustment setting to be described later.

An addition button 1410 is a button used to newly add a color verification profile setting. When the addition button 1410 is pressed, the site management application execution module 722 creates a new color verification profile DB 1200 and displays it on the color verification profile setting 1402. Exactly, the site management application execution module 722 transmits the information of the color verification profile DB 1200 to be newly created to the site management server 102, and the information is saved in the data management module 704. A deletion button 1411 is a button used to delete a color verification profile setting. If the deletion button 1411 is pressed in a state in which an arbitrary color verification profile is selected, the site management application execution module 722 transmits a notification representing that the selected color verification profile is to be deleted to the site management server 102. Accordingly, the selected color verification profile is deleted from the data management module 704 and also erased from the list.

Figure 15:
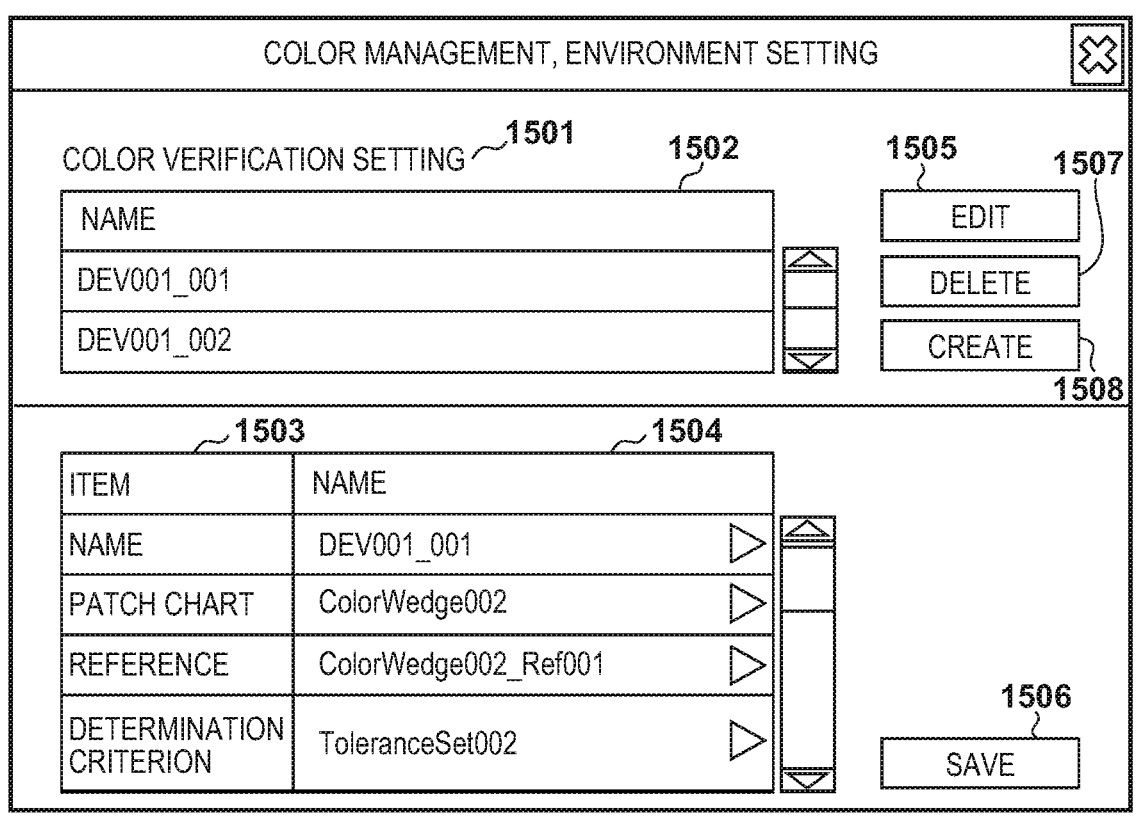
FIG. 15 depicts a view showing an example of a color verification setting editing screen in the environment setting of the site management application according to the first embodiment.

FIG. 15 depicts a view showing an example of a color verification setting editing screen in the environment setting of the site management application according to the first embodiment.

When the color verification setting editing button 1407 is pressed in the screen shown in FIG. 14, the site management application execution module 722 generates the UI, and the screen is displayed on the display unit (not shown) via the UI control module 723.

A color verification setting 1501 selectively displays the list of color verification settings linked with the printing apparatus 203 selected in the screen shown in FIG. 14. The site management application execution module 722 inquires of the data management module 704, obtains the color verification setting information, and displays it. A setting name list 1502 corresponds to the name 1212 in the obtained color verification setting DB 1210 in FIG. 12A. When the color expert selects an arbitrary color verification setting in the setting name list 1502, the site management application execution module 722 inquires of the data management module 704, and obtains pieces of detailed information of the color verification setting. Then, the obtained pieces of detailed information of the color verification setting are displayed in an item 1503 and a name 1504. FIG. 15 shows an example in which a name "DEV001_001" is selected. The items and the names displayed here are the information of the patch chart 1213 through the job property 1217 saved in the color verification setting DB 1210. The name displayed in the field of patch chart corresponds to the name 1242 in the patch chart DB 1240 in FIG. 12B. The name displayed in the field of reference corresponds to the name 1252 in the reference DB 1250 in FIG. 12B. In addition, the name displayed in the field of determination criterion corresponds to the name 1262 in the determination criterion DB 1260 in FIG. 12B.

An editing button 1505 is a button used to edit the color verification setting. When the editing button 1505 is pressed, a state in which the contents of each item can be edited is set. Details of editing of each item will be described later. When the color expert performs desired setting editing and presses a saving button 1506, the site management application execution module 722 transmits editing information to the site management server 102, and updates the registered information in the data management module 704. A deletion button 1507 is a button used to delete a color verification setting. When the deletion button 1507 is pressed by the color expert, the site management application execution module 722 transmits a notification representing that the information of the color verification setting selected in the setting name list 1502 is to be deleted to the site management server 102. Accordingly, the information of the selected color verification setting is deleted from the data management module 704 and also erased from the setting name list 1502. A creation button 1508 is a button used to newly create a color verification setting. When the creation button 1508 is pressed by the color expert, the site management application execution module 722 creates a new color verification setting DB 1210 and displays it on the screen. Exactly, the site management application execution module 722 transmits the information of the color verification setting DB 1210 to be newly created to the site management server 102, and the information is saved in the data management module 704.

Figure 16A:
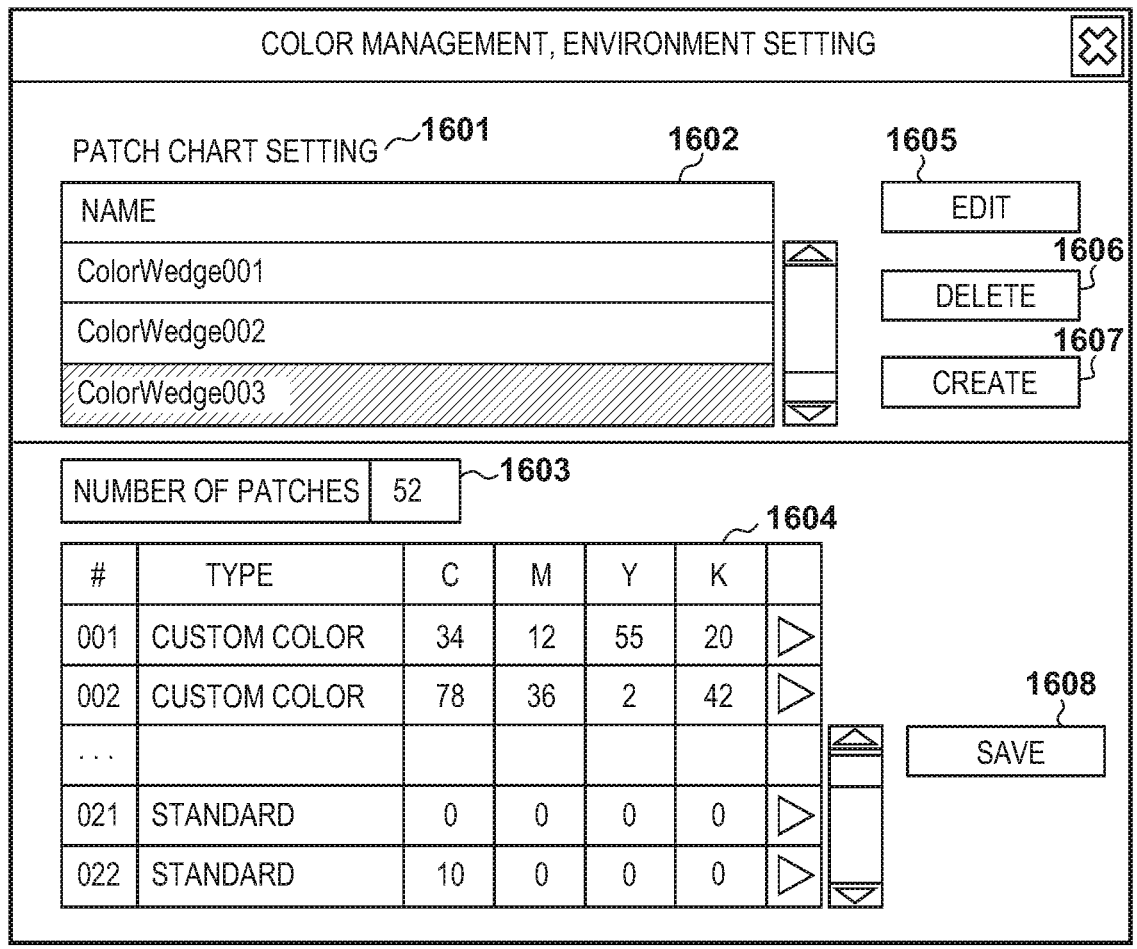
FIGS. 16A and 16B depict views showing an example of a patch chart editing screen in the environment setting of the site management application according to the first embodiment.

FIG. 16A depicts a view showing an example of a patch chart editing screen in the environment setting of the site management application according to the first embodiment.

When a patch chart of a color verification setting is selected in the screen shown in FIG. 15, and the editing button 1505 is pressed, the site management application execution module 722 generates the UI, and the screen is displayed on the display unit (not shown) via the UI control module 723.

A list 1601 of patch chart settings selectively displays the list of patch chart settings linked with the printing apparatus 203 selected in the screen shown in FIG. 14. The site management application execution module 722 inquires of the data management module 704, and obtains patch chart setting information. Then, the obtained patch chart setting information is displayed. A setting name list 1602 corresponds to the name 1242 in the obtained patch chart DB 1240. When the color expert selects an arbitrary patch chart setting in the setting name list 1602, the site management application execution module 722 inquires of the data management module 704, and obtains pieces of detailed information of the patch chart setting. Then, the obtained pieces of detailed information of the patch chart setting are displayed by the number 1603 of patches and a list 1604. The items and the names displayed here are pieces of information corresponding to the number 1243 of patches to the patch 1246 saved in the patch chart DB 1240. The number 1603 of patches is the number of patches saved in the number 1243 of patches. The list 1604 includes the pieces of input signal value information of the patches saved in 1244 through 1246 of the patch chart DB 1240. As for the items displayed in the list 1604, columns as many as the number of patches displayed in the number 1603 of patches are created. Buttons 1605 through 1608 are buttons used to edit, delete, create, and save a patch chart setting, respectively. The same operations as those of the buttons 1505 to 1508 in the color verification setting screen shown in FIG. 15 described above are performed for the patch chart DB 1240.

FIG. 16A shows an example in which "ColorWedge003" is selected as the patch chart setting. The patches include custom colors defined by the CMYK values.

The creation button 1607 is a button used to newly create a patch chart setting. When the creation button 1607 is pressed, the site management application execution module 722 creates a patch chart creation UI screen shown in FIG. 16B and displays it on the display unit (not shown). On the patch chart creation UI screen, a creation method of the patch chart is confirmed for the color expert.

When an "extract color from print data" button 1611 is pressed, the site management application execution module 722 accepts arbitrary print data whose colors should be extracted as the target of color verification processing from the color expert via a general file designation method. When an "import" button 1612 is pressed, the site management application execution module 722 accepts a designation of import data of a predetermined format. The import data is, for example, a CSV file, and the input CMYK values of a custom color are recorded. When a "direct input" button 1613 is pressed, the site management application execution module 722 displays a UI screen of the same format as the input signal value information display portion of the patches in the list 1604, and accepts manual input of the CMYK values of the patch chart from the color expert.

In the following new patch chart creation processing for a custom color according to the first embodiment, a case in which the "extract color from print data" button 1611 is pressed will be described as an example.

A check box 1614 is an automatic reference generation check box. The color expert is caused to designate whether or not to automatically calculate a reference for a patch chart newly created by the above-described method. Details of processing concerning the check box 1614 will be described later.

FIG. 17 depicts a view showing an example of a reference editing screen in the environment setting of the site management application according to the first embodiment.

When the reference in the color verification setting is selected in the screen shown in FIG. 15, and the editing button 1505 is pressed, the site management application execution module 722 generates the UI, and the screen is displayed on the display unit (not shown) via the UI control module 723.

A reference 1701 selectively displays the list of reference settings linked with the printing apparatus 203 selected in the screen shown in FIG. 14. The site management application execution module 722 inquires of the data management module 704, obtains reference setting information, and displays it. A setting name list 1702 corresponds to the name 1252 in the obtained reference DB 1250. When the color expert selects an arbitrary reference setting in the setting name list 1702, the site management application execution module 722 inquires of the data management module 704, and obtains pieces of detailed information of the reference setting. Then, the obtained pieces of detailed information of the reference setting are displayed by the number 1703 of patches and a list 1704. The items and the names displayed here correspond to the number 1253 of patches to the number 1256 of patches saved in the reference DB 1250. The number 1703 of patches is the number of patches saved in the number 1253 of patches. The list 1704 corresponds to the input signal value information of the patches saved in 1254 through 1256 of the reference DB 1250, and the target value information. As for the items displayed in the list 1704, columns as many as the number of patches displayed in the number 1703 of patches are created.

FIG. 17 shows an example in which "Ref003" is selected in the reference setting name list 1702. The patches of the reference include custom colors defined by the CMYK values.

Buttons 1705 through 1708 are buttons used to edit, delete, create, and save a reference setting, respectively. The same operations as those of the buttons 1505 to 1508 used to perform editing, deletion, creation, and saving in the color verification setting screen shown in FIG. 15 described above are performed for the reference DB 1250, and a description thereof will be omitted here.

Figure 18:
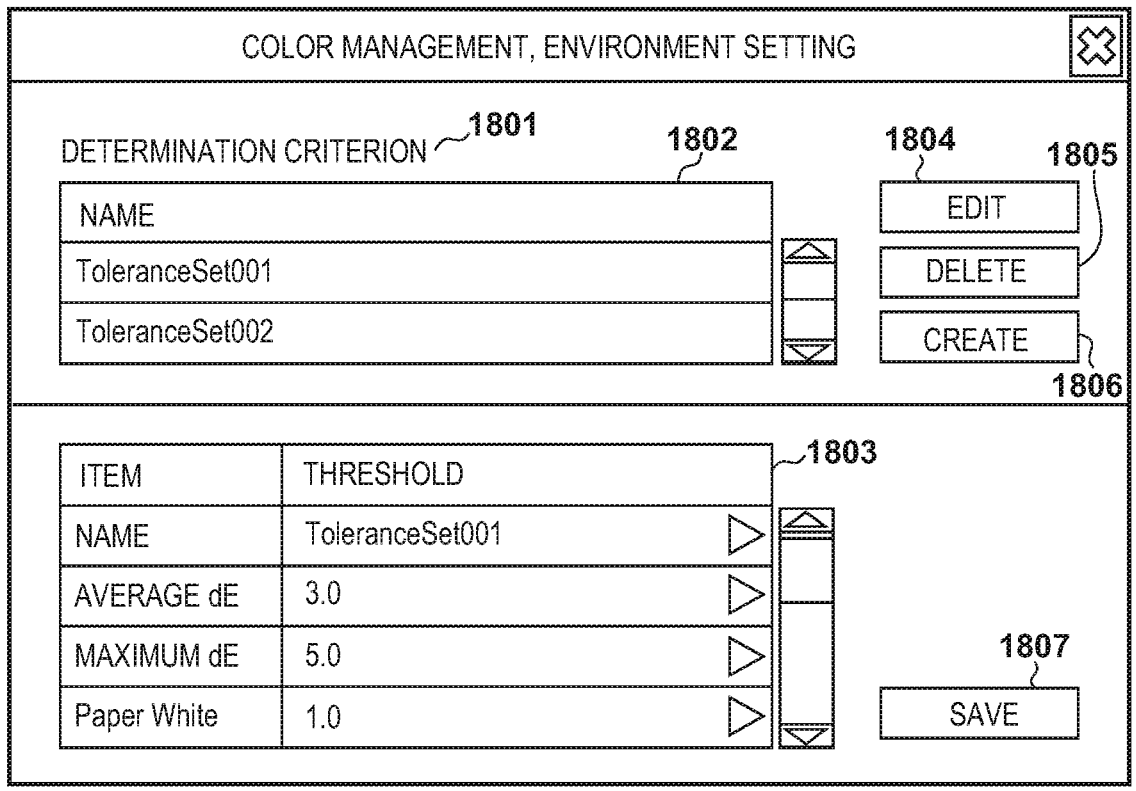
FIG. 18 depicts a view showing an example of a determination criterion editing screen in the environment setting of the site management application according to the first embodiment.

FIG. 18 depicts a view showing an example of a determination criterion editing screen in the environment setting of the site management application according to the first embodiment.

When the determination criterion in the color verification setting is selected in the screen shown in FIG. 15, and the editing button 1505 is pressed, the site management application execution module 722 generates the UI, and the screen is displayed on the display unit (not shown) via the UI control module 723.

A determination criterion 1801 selectively displays the list of determination criterion settings linked with the printing apparatus 203 selected in the screen shown in FIG. 14. The site management application execution module 722 inquires of the data management module 704, obtains determination criterion setting information, and displays it. A setting name list 1802 corresponds to the name 1262 in the obtained determination criterion DB 1260. When the color expert selects an arbitrary determination criterion setting in the setting name list 1802, the site management application execution module 722 inquires of the data management module 704, obtains pieces of detailed information of the determination criterion setting, and displays them in a list 1803. The items and the names displayed here correspond to the pieces of information of the averages 1263 through 1269 saved in the determination criterion DB 1260 in FIG. 12B. Buttons 1804 through 1807 are buttons used to edit, delete, create, and save a determination criterion setting, respectively. The same operations as those of the buttons 1505 through 1508 used to perform editing, deletion, creation, and saving in the color verification setting screen shown in FIG. 15 described above are performed for the determination criterion DB 1260, and a description thereof will be omitted here.

Figure 19:
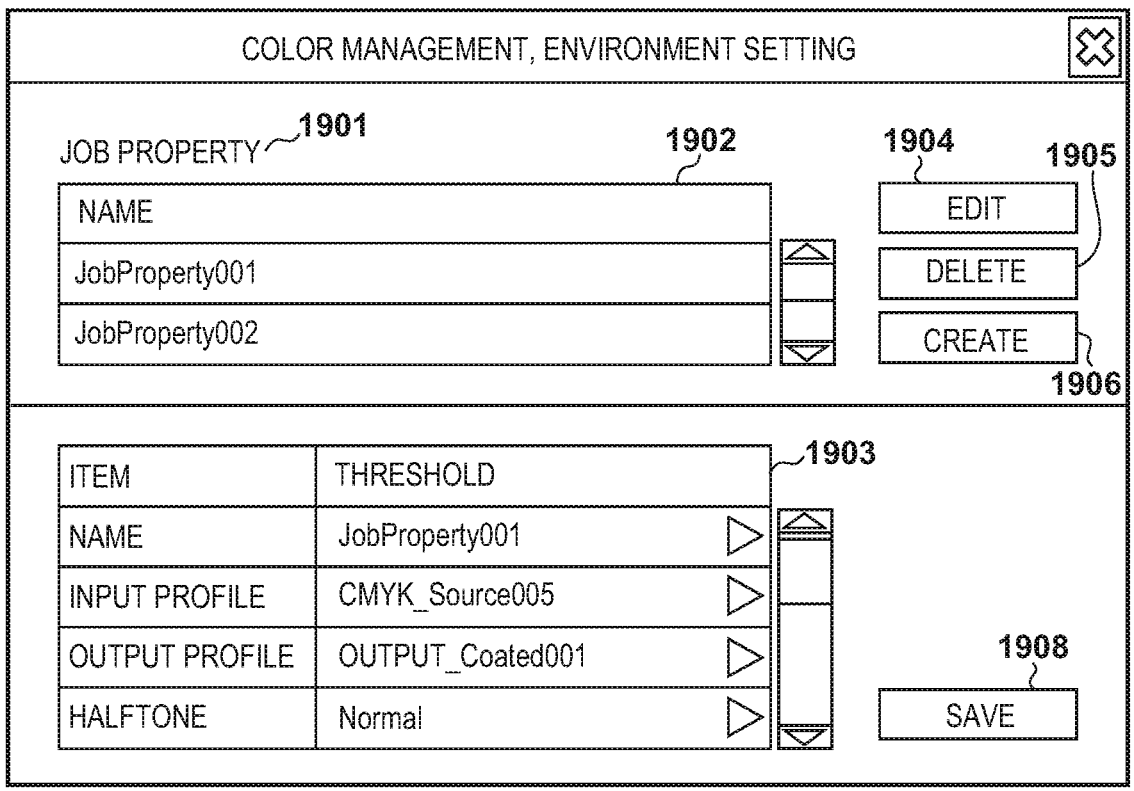
FIG. 19 depicts a view showing an example of a job property editing screen in the environment setting of the site management application according to the first embodiment.

FIG. 19 depicts a view showing an example of a job property editing screen in the environment setting of the site management application according to the first embodiment.

When the editing button 1505 in the field of the job property item in the color verification setting is pressed in the screen shown in FIG. 15, the site management application execution module 722 generates the UI, and the screen is displayed on the display unit (not shown) via the UI control module 723. A job property 1901 selectively displays the list of job property settings linked with the printing apparatus 203 selected in the area 1401 shown in FIG. 14. The site management application execution module 722 inquires of the data management module 704, obtains job property setting information, and displays it. A setting name list 1902 corresponds to the name 1272 in the acquired job property DB 1270. When the color expert selects an arbitrary job property setting in the setting name list 1902, the site management application execution module 722 inquires of the data management module 704, obtains pieces of detailed information of the job property setting, and displays them in a list 1903. The items and the names displayed in the list 1903 correspond to the input profiles 1273 through 1275 saved in the job property DB 1270 in FIG. 12B. Buttons 1904 through 1908 are buttons used to edit, delete, create, and save a job property setting, respectively. The same operations as those of the buttons 1505 through 1508 used to perform editing, deletion, creation, and saving in the color verification setting screen shown in FIG. 15 described above are performed for the job property DB 1270, and a description thereof will be omitted here.

Figure 20:
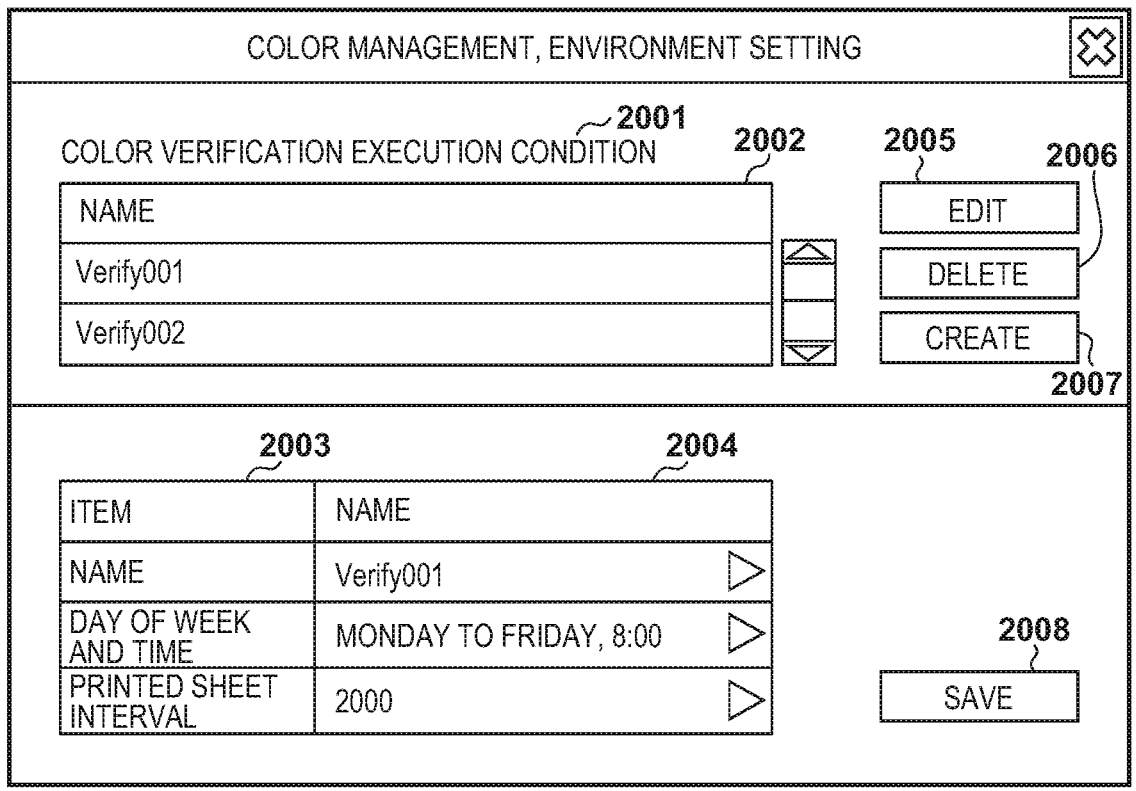
FIG. 20 depicts a view showing an example of a color verification execution condition editing screen in the environment setting of the site management application according to the first embodiment.

FIG. 20 depicts a view showing an example of a color verification execution condition editing screen in the environment setting of the site management application according to the first embodiment.

When the editing button 1408 of the color verification execution condition is pressed in the screen shown in FIG. 14, the site management application execution module 722 generates the UI, and the screen is displayed on the display unit (not shown) via the UI control module 723. A color verification execution condition 2001 selectively displays the list of color verification execution conditions. The site management application execution module 722 inquires of the data management module 704, obtains color verification execution condition information, and displays it. A setting name list 2002 corresponds to the name 1222 in the obtained color verification execution condition DB 1220. When the color expert selects an arbitrary color verification execution condition in the setting name list 2002, the site management application execution module 722 inquires of the data management module 704, obtains pieces of detailed information of the color verification execution condition, and displays them in an item 2003 and a name 2004. The items and the names displayed here correspond to the name 1222 and the printed sheet interval 1224 saved in the color verification execution condition DB 1220. Buttons 2005 through 2008 are buttons used to edit, delete, create, and save a color verification execution condition, respectively. The same operations as those of the buttons used to perform editing, deletion, creation, and saving in the color verification setting screen shown in FIG. 15 described above are performed for the color verification execution condition DB 1220, and a description thereof will be omitted here.

Figure 21:
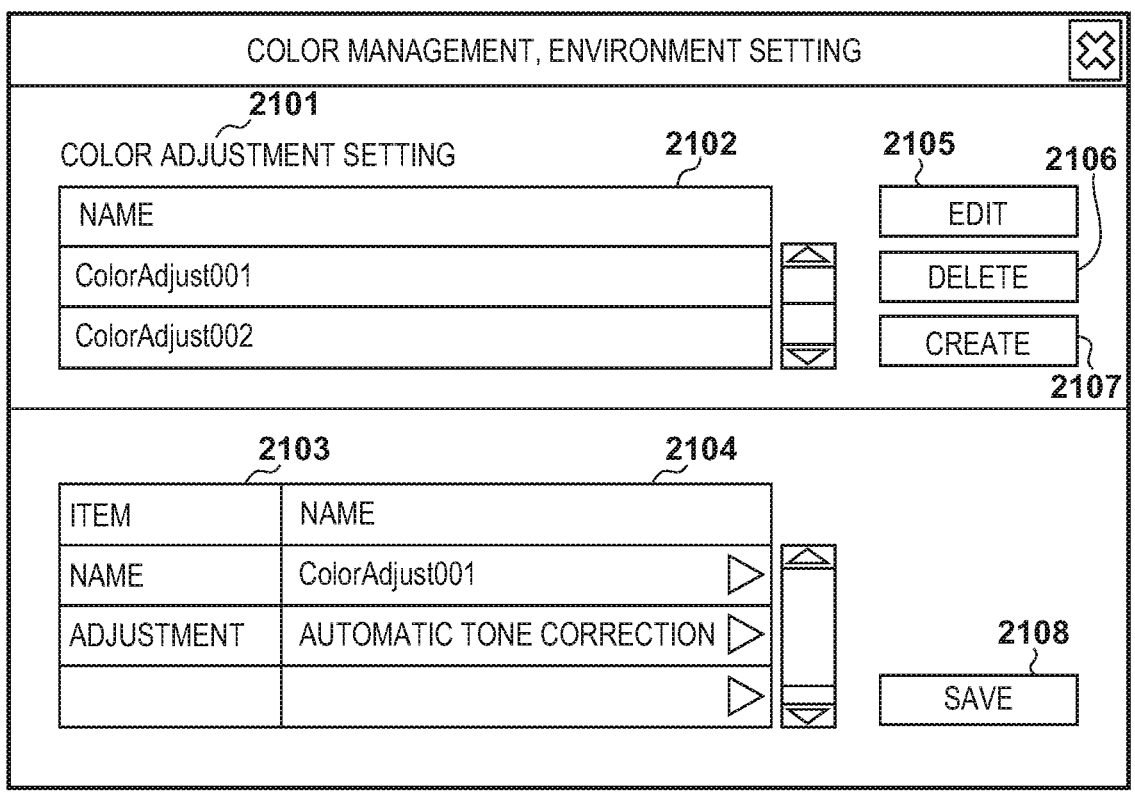
FIG. 21 depicts a view showing an example of a color adjustment setting editing screen in the environment setting of the site management application according to the first embodiment.

FIG. 21 depicts a view showing an example of a color adjustment setting editing screen in the environment setting of the site management application according to the first embodiment.

When the editing button 1409 of the color adjustment setting in the screen shown in FIG. 14 is pressed, the site management application execution module 722 generates the UI, and the screen is displayed on the display unit (not shown) via the UI control module 723. A color adjustment setting 2101 selectively displays a list 2102 of color adjustment settings. The site management application execution module 722 inquires of the data management module 704, obtains color adjustment setting information, and displays it. The list 2102 corresponds to the name 1232 in the obtained color adjustment setting DB 1230. When the color expert selects an arbitrary color adjustment setting in the list 2102, the site management application execution module 722 inquires of the data management module 704, obtains pieces of detailed information of the color adjustment setting, and displays them in an item 2103 and a name 2104. The items and the names displayed here correspond to the name 1232 and the adjustment 1233 saved in the color adjustment setting DB 1230 in FIG. 12A. Buttons 2105 through 2108 are buttons used to edit, delete, create, and save a color adjustment setting, respectively. The same operations as those of the buttons used to perform editing, deletion, creation, and saving in the color verification setting screen shown in FIG. 15 described above are performed for the color adjustment setting DB 1230, and a description thereof will be omitted here.

In the above-described way, the color expert executes the environment setting necessary for performing color management via the screens shown in FIGS. 14 through 21. Note that the UI screens of environment setting described here and setting items and formats displayed in them are merely examples, and another UI screen arrangement in which, for example, the environment setting and result display are included in the same screen may be employed as long as it can achieve the same purpose as described above.

The environment setting information concerning color management, which is instructed by the site management application execution module 722 and saved in the data management module 704, is then transmitted from the printer communication module 703 to the printing apparatus 203. The printer controller 500 of the printing apparatus 203 saves, in the data management module 806, the environment setting information received via the data transmission/reception module 804. When the color verification execution condition is satisfied in accordance with the environment setting information, the color management module 805 executes color verification processing. When the color verification processing is executed, the color management module 805 saves the measured result information in the data management module 806, and further transmits it to the site management server 102 to save it in the data management module 704. The data management module 704 saves the measured result information transmitted from the color management module 805 in 12901 through 12912 of the corresponding patch DB 12900.

<Color Verification Result of Printing Apparatus>

An example of a UI screen configured to display a result of color verification processing executed according to a designated environment setting will be described next with reference to FIGS. 22 through 24.

Figure 22:
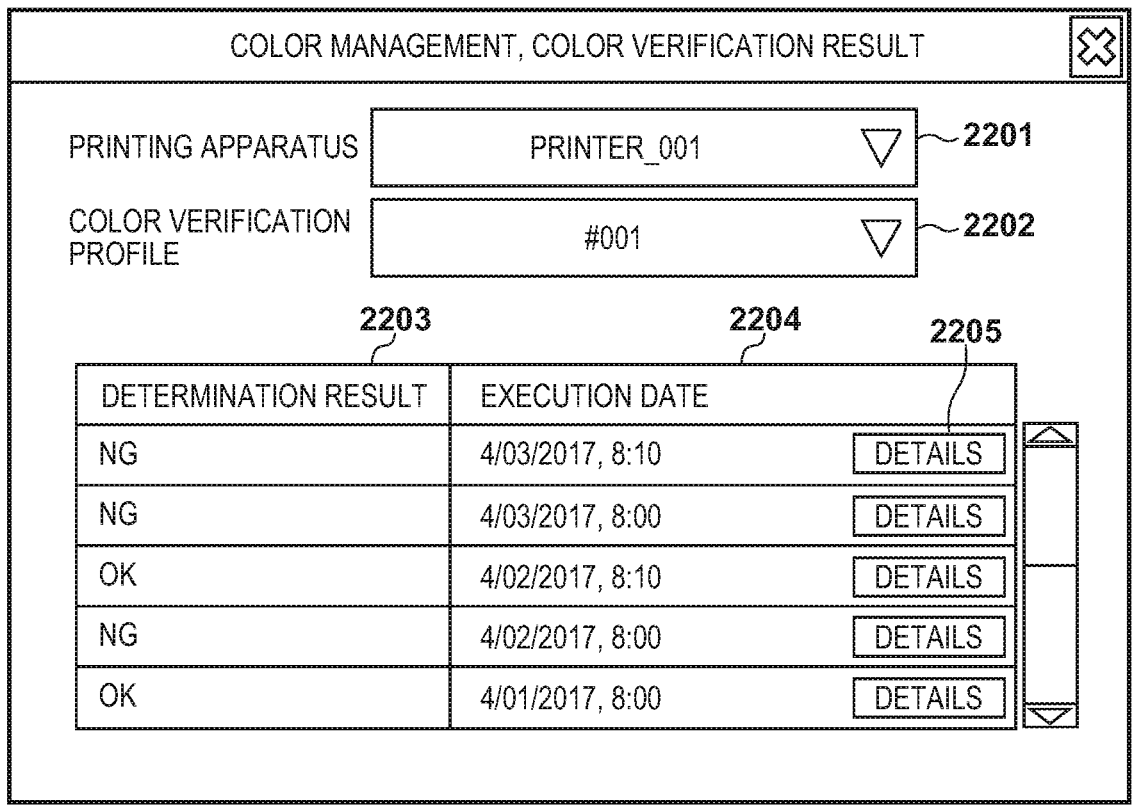
FIG. 22 depicts a view showing an example of the color verification result screen of the site management application according to the first embodiment.

FIG. 22 depicts a view showing an example of the color verification result screen of the site management application according to the first embodiment.

When the color verification result button 1302 is pressed in the screen shown in FIG. 13, the site management application execution module 722 generates the UI, and the screen is displayed on the display unit (not shown) via the UI control module 723. In an area 2201, the printing apparatus 203 as the target to display a color verification result is selectively displayed. The site management application execution module 722 inquires of the data management module 704, obtains the information of the printing apparatus 203 registered by the color expert, and displays it. A color verification profile 2202 selectively displays a color verification profile linked with the selected printing apparatus 203. When the printing apparatus 203 is selected, the site management application execution module 722 inquires of the data management module 704.

The site management application execution module 722 then obtains the information of the same color management profile DB as that of the selected printing apparatus 203, and displays it in the color verification profile 2202. When the color expert selects an arbitrary color verification profile in the color verification profile 2202, the site management application execution module 722 inquires of the data management module 704, and obtains pieces of detailed information of the color verification result of the target. Then, the obtained pieces of detailed information are displayed in a determination result 2203 and an execution date 2204. The determination result 2203 displays the determination result information of the executed color verification position. The site management application execution module 722 obtains the information of the color verification profile DB 1200 of the target from the data management module 704. Based on the obtained information, the difference between a measured value and a target value is calculated for each patch, and the result is compared with a determination criterion, thereby deciding the determination result.

This will be described below using an example. The information of a certain patch is saved in the patch DB 12900. In this case, the measured values of the patch are saved in 12910 through 12912 (L*_dev, a*_dev, b*_dev), and target values are saved in 12907 through 12909 (L*_ref, a*_ref, b*_ref). A difference Delta_E can be expressed by, for example, $$\text{Delta\_}E=\sqrt{((L^*\_\text{ref}-L^*\_\text{dev})^2+(a^*\_\text{ref}-a^*\_\text{dev})^2+(b^*\_\text{ref}-b^*\_\text{dev})^2)}$$

Here the measured values and the target values are expressed by the CIE_L*a*b* space, and a calculation of obtaining a general color difference (Delta_E) is performed. However, the difference amount is not always calculated by this expression. The calculated value Delta_E is compared with a threshold for each setting item of the determination criterion DB 1260. For example, as for the average, the threshold saved in the average 1263 is used and compared with the average value of the values Delta_E of all patches designated in the patch chart DB 1240. Similarly, actual measured values saved in 12910 through 12912 of the patch DB 12900 are compared with thresholds saved in 1263 through 1269 of the determination criterion DB 1260. If a relation represented by $$(\text{actual measured value}) \leq (\text{threshold of determination criterion item})$$

holds, the determination result is OK. If a reverse relation is obtained, the determination result is NG.

The site management application execution module 722 displays, in the determination result 2203, the determination results of some or all of color verification processes executed in the past, which are saved in the data management module 704. In addition, the site management application execution module 722 displays, in the execution date 2204, the information of the execution date when each color verification processing has been executed. The site management application execution module 722 obtains the information of the measured result DB 1280 from the data management module 704, and displays the execution date saved in the execution date 1282. When the color expert presses a detail button 2205 to know more detailed information of the determination result the site management application execution module 722 displays, for example, the screen shown in FIG. 23.

Figure 23:
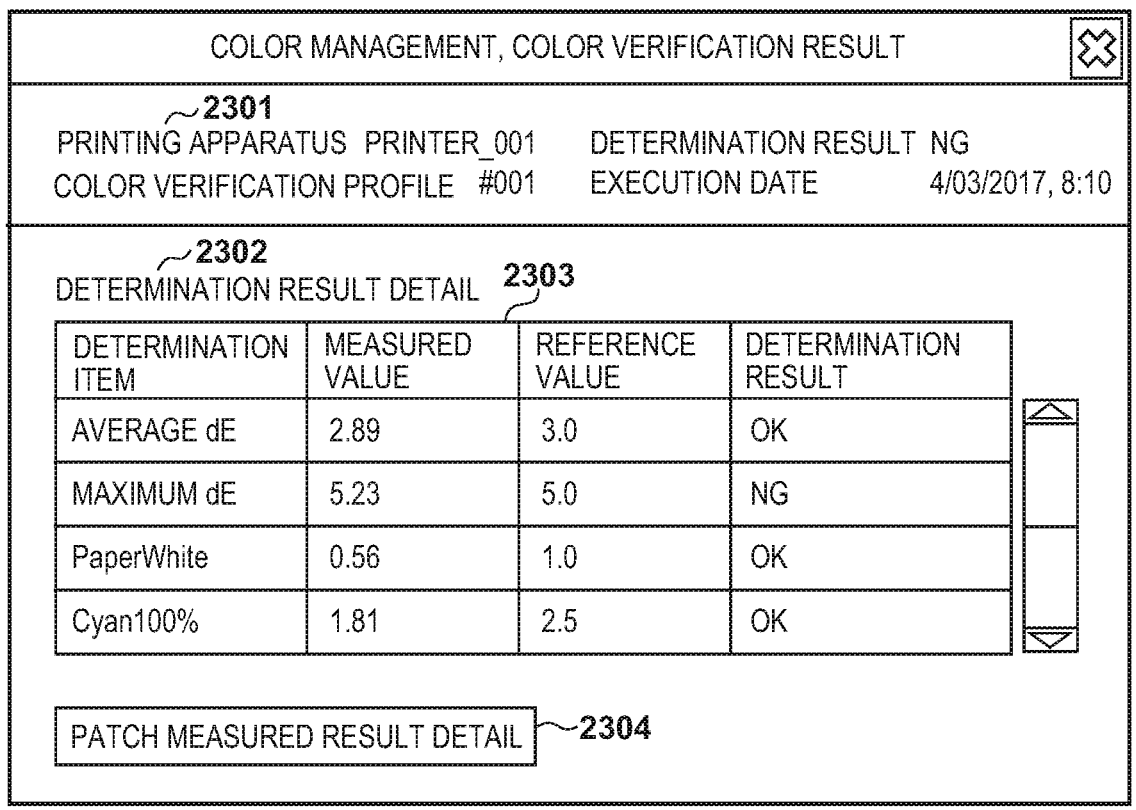
FIG. 23 depicts a view showing an example of the color verification result screen of the site management application according to the first embodiment.

FIG. 23 depicts a view showing an example of the color verification result screen of the site management application according to the first embodiment.

When the detail button 2205 is pressed in the screen shown in FIG. 22, the site management application execution module 722 generates the UI, and the screen is displayed on the display unit (not shown) via the UI control module 723. In an area 2301, detailed information about the selected color verification processing result is displayed. The site management application execution module 722 collects necessary information from the data management module 704 and displays it. Here, pieces of information of the printing apparatus DB 12920, the color verification profile DB 1200, the determination result, and the execution date 1282 are displayed. However, the present invention is not limited to this, and other information may be displayed.

A list 2303 of a determination result 2302 displays detailed information based on the determination criterion for the selected color verification processing result. The site management application execution module 722 collects necessary information from the data management module 704 and displays it. Here, pieces of information calculated by the above-described determination processing are displayed in correspondence with the determination criteria of 1263 through 1269 included in the determination criterion DB 1260. A determination result is displayed for each determination item. For this reason, when the printing apparatus 203 is determined as NG, the color expert can use the determination result as information used to specifically analyze which item is the cause of the NG. When the color expert presses a patch measured result detail button 2304 to know a detailed measured result of each patch, the site management application execution module 722 displays the screen shown in FIG. 24.

FIG. 24 depicts a view showing an example of the color verification result screen of the site management application according to the first embodiment.

When the patch measured result detail button 2304 is pressed in the screen shown in FIG. 23, the site management application execution module 722 generates the UI, and the screen is displayed on the display unit (not shown) via the UI control module 723. In an area 2401, detailed information about the selected color verification processing result is displayed. This is the same information as that in the area 2301 shown in FIG. 23, and a description thereof will be omitted. A patch measured result 2402 displays detailed information based on patch information for the selected color verification processing result. The site management application execution module 722 collects necessary information from the data management module 704 and displays it. Here, the following values are displayed for each patch saved in the patch chart DB used for the determination. That is, input signal value information (12903 through 12906), measured values (12910 through 12912), reference values defined as targets (12907 through 12909), and dE_L*a*b* values by the above-described expression are displayed. The color expert can grasp the color characteristics of the printing apparatus 203 based on these pieces of information, or can use the information as information to do more detailed analysis in a case in which the determination result is NG.

Using the above-described color management system, in the first embodiment, new registration processing of the color verification setting of a custom color will be described with reference to the flowchart of FIGS. 25A and 25B.

Figure 25A:
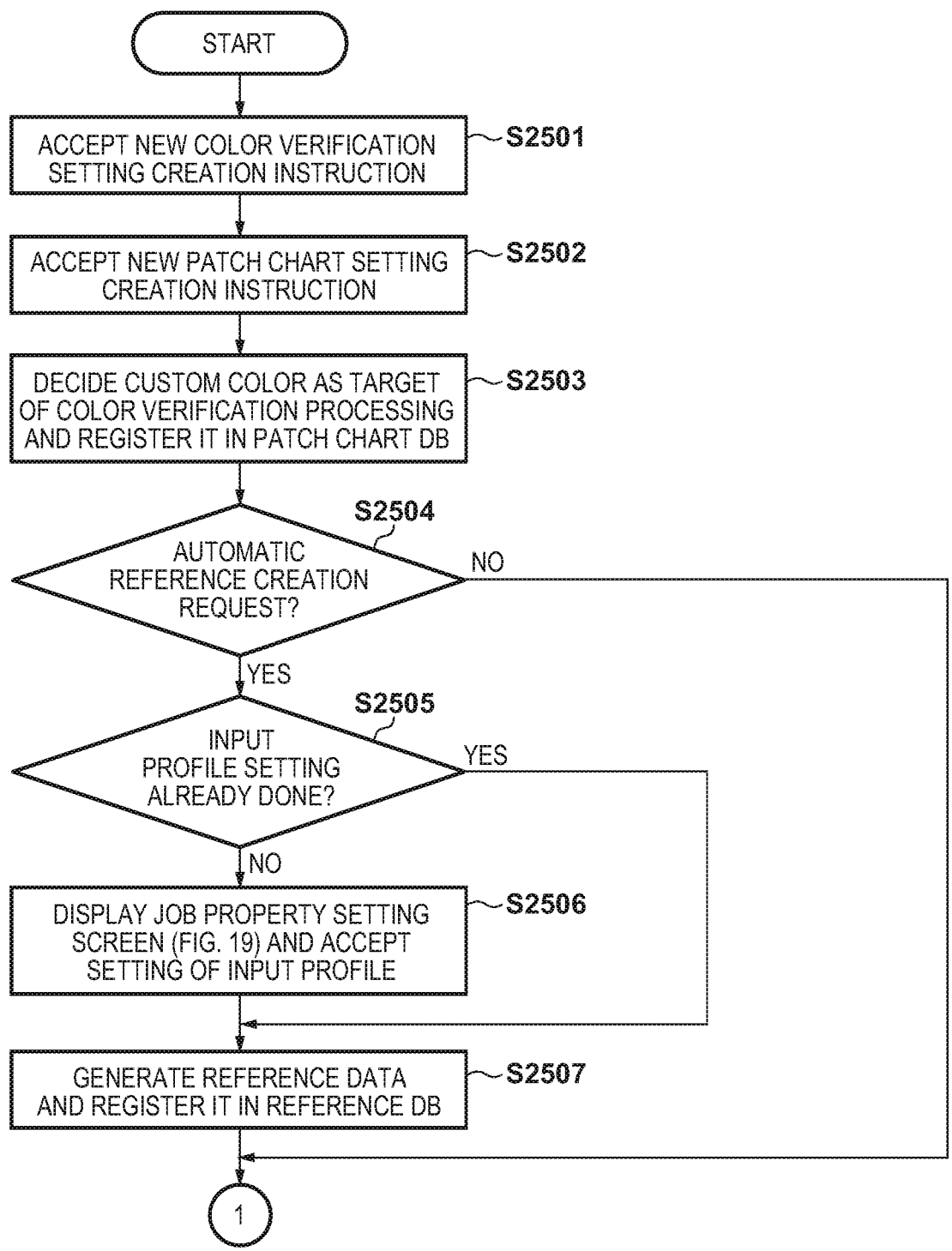
FIGS. 25A and 25B are flowcharts for describing registration processing of the color verification setting of a custom color by the site management server according to the first embodiment.
Figure 25B:
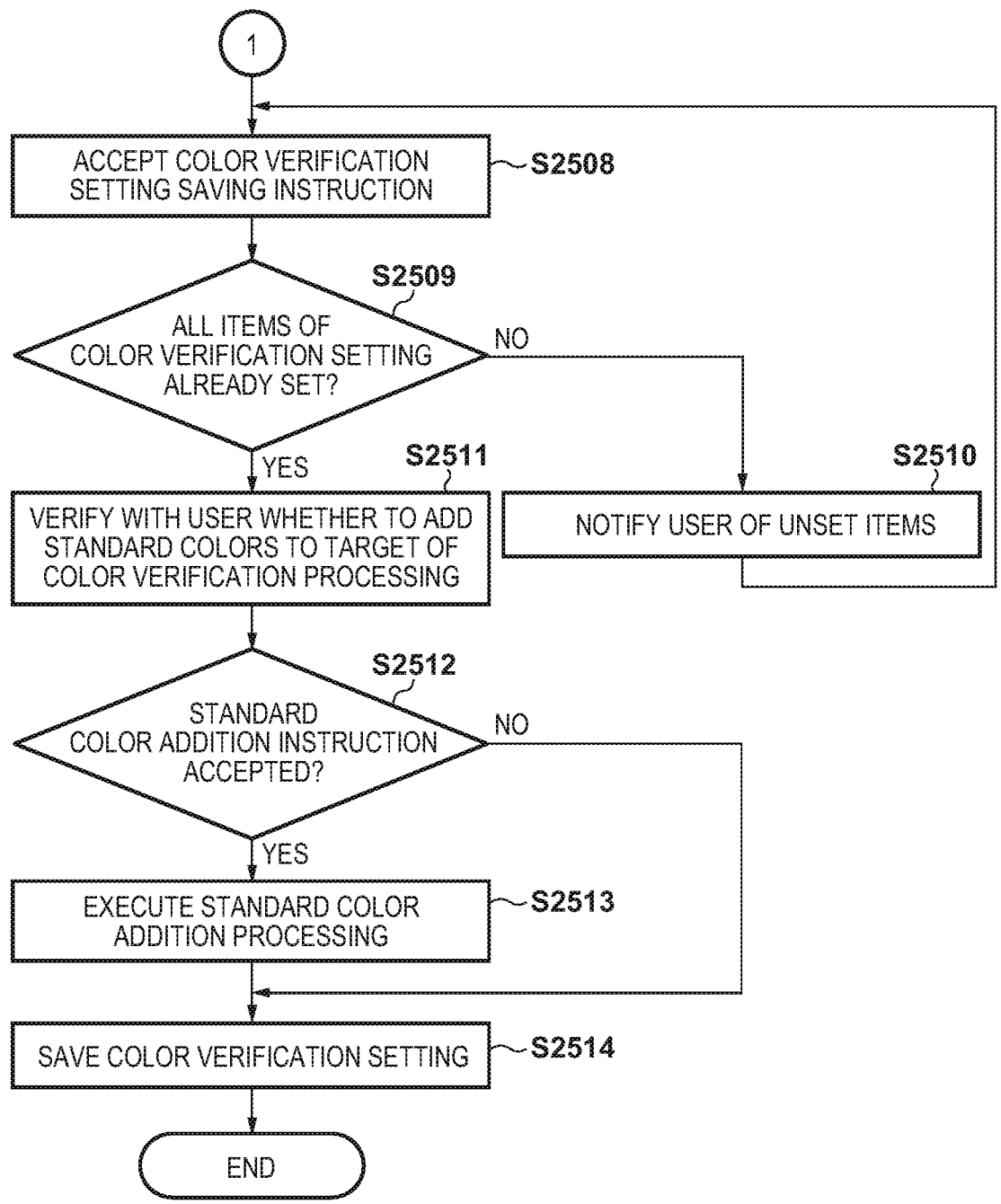

FIGS. 25A and 25B are flowcharts for describing registration processing of the color verification setting of a custom color by the site management server 102 according to the first embodiment. Note that the processing represented by the flowchart is implemented when the CPU 401 deploys a program stored in the HDD 404 into the RAM 403 and executes the deployed program.

First, in step S2501, the CPU 401 accepts a new color verification setting creation instruction from the user. Then, the process advances to step S2502, and the CPU 401 accepts a new patch chart setting creation instruction from the user. As described above, in the first embodiment, the user selects the "extract color from print data" button 1611 (FIG. 16B) and designates arbitrary print job data. When accepting the new creation instruction, the CPU 401 stores the state of the automatic reference generation designation check box 1614. The process advances to step S2503, and the CPU 401 extracts, by a known method, an important color (custom color) from the data of the print job designated in step S2502 and registers it in the patch chart DB 1240 and the patch DB 12900. More specifically, in the patch DB 12900, "custom color" is registered in the patch type 12913, and the CMYK values of the extracted custom color are registered in the input signal information 12903 through 12906 of the patch. Furthermore, in the patch chart DB 1240, the number 1243 of patches and the pieces of link information 1244 through 1246 to the patch DB are registered, and a value representing a custom color is set in the custom color flag 1247.

Figure 16B:
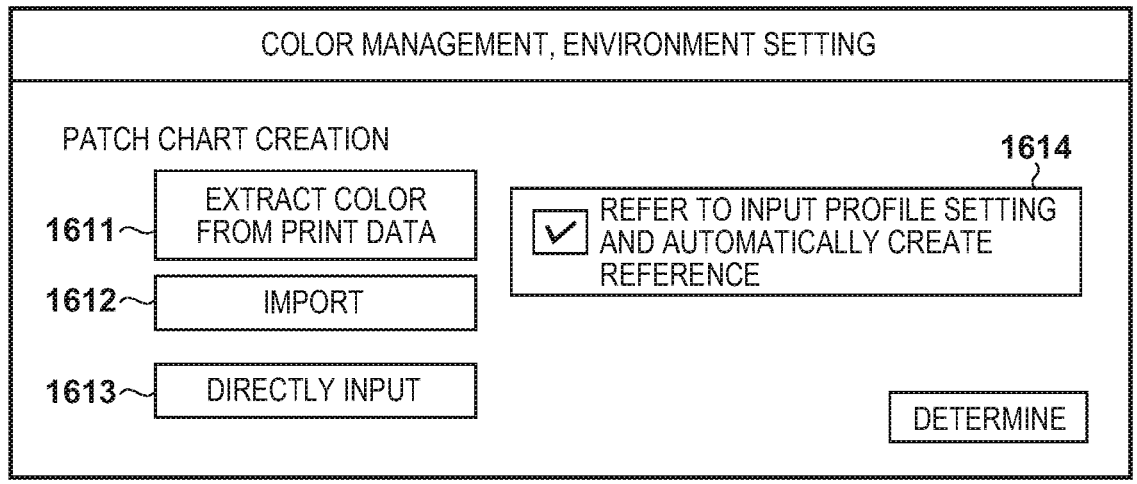

Then, the process advances to step S2504, and the CPU 401 determines whether or not the automatic reference generation designation check box 1614 shown in FIG. 16B is validated. If the automatic reference generation designation check box 1614 is validated, the process advances to step S2505. Otherwise, the process advances to step S2508. In step S2505, the CPU 401 determines, by referring to the input profile 1273, whether or not an input profile setting is already done for the color verification setting. If a value that is valid as the input profile setting is already set in the input profile 1273, the CPU 401 determines that the setting is already done, and advances the process to step S2507. Otherwise, the CPU 401 advances the process to step S2506. In step S2506, the CPU 401 displays the job property setting screen shown in FIG. 19 on the display unit, and accepts an input from the user. In this case, at least an input profile setting is accepted. After that, the process advances to step S2507, and the CPU 401 refers to the designated input profile setting, and obtains input profile data from the printer controller 500. The CPU 401 then calculates a reference using the input signal values of the custom color extracted in step S2503 and the input profile data. Here, the input profile data includes an LUT used to convert the CMYK color space into the L*a*b* color space. The CPU 401 performs interpolation calculation of the LUT for arbitrary CMYK values, thereby calculating L*a*b* values as a reference. Then, the process advances to step S2508.

In step S2508, the CPU 401 accepts a color verification setting saving instruction from the user. The process then advances to step S2509, and the CPU 401 determines whether or not all items necessary for saving the color verification setting are already set. Upon determining here that the items are already set, the process advances to step S2511. Otherwise, the process advances to step S2510, and the CPU 401 notifies the user of unset items, and returns the process to step S2508.

Figure 26A:
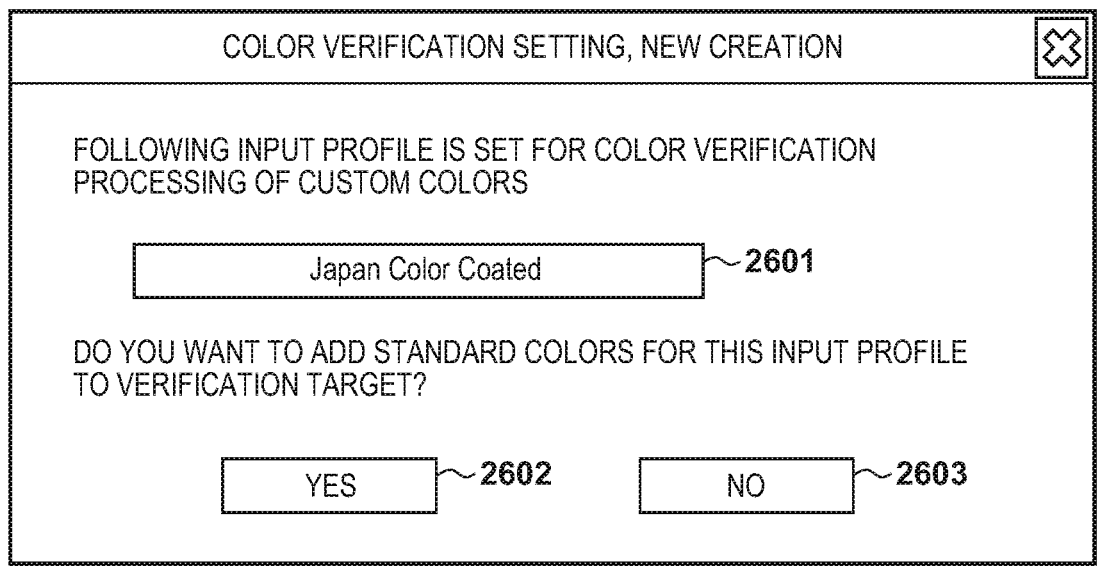
FIG. 26A depicts a view showing an example of a standard color addition verification UI screen according to the first embodiment.

In step S2511, the CPU 401 displays a standard color addition verification UI screen shown in FIG. 26A on the display unit. The CPU 401 then verifies with the user whether or not to add standard colors corresponding to a designated input profile 2601 to the target of color verification processing. In this example, the input profile of a color standard "Japan Color Coated" is designated. In step S2512, the CPU 401 determines whether or not an instruction to add the standard colors to the target of color verification processing is accepted from the user. That is, if the instruction is accepted (a "YES" button 2602 is pressed), the CPU 401 advances the process to step S2513. if a "NO" button 2603 is pressed, the CPU 401 advances the process to step S2514. In step S2513, the CPU 401 executes processing of adding the standard colors to the target of color verification processing.

More specifically, first, the CPU 401 specifies the input profile 1273 of the color verification setting of the custom color. A color verification setting using the same input profile is specified from the job property DB 1270 and the color verification setting DB 1210. Next, the CPU 401 refers to the custom color flag 1247 of the patch chart DB 1240, and determines whether or not a patch chart based on the specified color verification setting includes a custom color. Here, if a custom color is not included, the patch of the patch chart is decided as the target to be added to the color verification processing. The following processing is executed, in each DB, for the patches of the standard colors that thus become addition targets.

First, the patch DB 12900 for each standard color patch of an addition target is newly registered. At this time, the input signal values 12903 through 12906 and the references 12907 through 12909 of each patch are copied from the registered values. Next, the patch chart DB 1240 for the custom color is updated. More specifically, in accordance with addition of a standard color patch, the number 1243 of patches is updated, and link information to the patch DB 12900 is added. Similarly, the reference DB 1250 for the custom color is also updated. More specifically, in accordance with addition of a standard color patch, the number 1253 of patches is updated, and link information to the patch DB 12900 is added.

Note that in the above-described processing, if the patch chart of the standard color as the addition target is not found, the CPU 401 displays a message representing that the addition of the standard color is impossible, and advances the process to step S2514. Finally, in step S2514, the CPU 401 saves the color verification setting, and ends the new color verification setting registration processing.

In the first embodiment, color verification processing is executed for the color verification setting registered by the above-described processing. In addition, color adjustment processing according to the result of color verification processing and notification processing to the color expert or the operator (user) are executed. A control procedure concerning these processes will be described with reference to the flowcharts of FIGS. 27 and 28.

Figure 27:
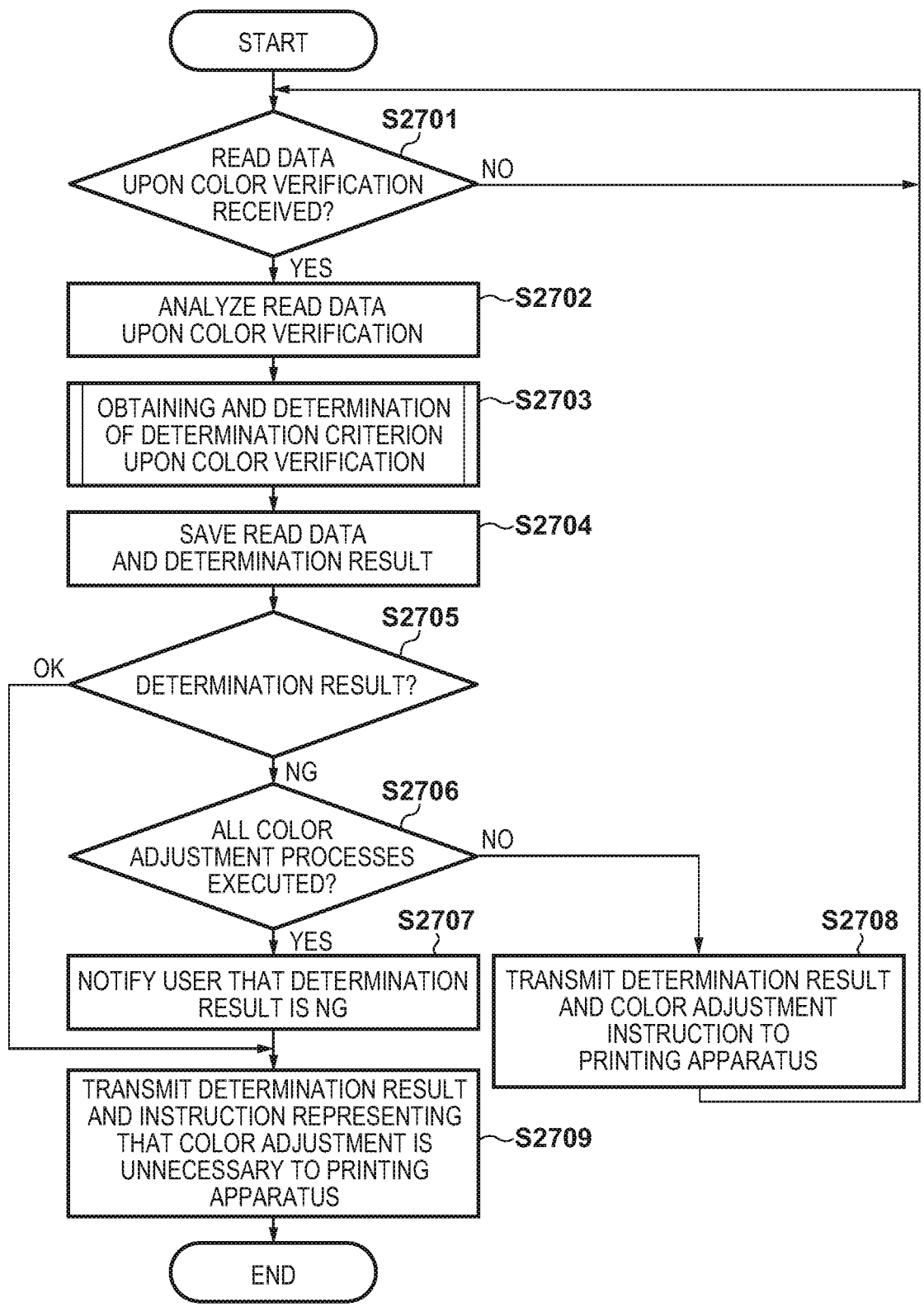
FIG. 27 is a flowchart for describing processing of the site management server according to the first embodiment.

FIG. 27 is a flowchart for describing processing by the site management server 102 according to the first embodiment. Note that the processing represented by the flowchart is implemented when the CPU 401 deploys a program stored in the HDD 404 into the RAM 403 and executes the deployed program. In this processing, the site management server 102 receives a result obtained by printing a chart image by the printing apparatus 203 and measuring the image and determines the result of color verification processing in the printing apparatus 203 based on a determination criterion.

First, in step S2701, the CPU 401 determines whether or not measured data for color verification is received from the printing apparatus 203. Upon determining that color verification measured data is received, the process advances to step S2702. The color verification measured data is data including the measured result of the chart image printed by the printing apparatus 203. In step S2702, the CPU 401 analyzes the received color verification measured data, and advances to step S2703. The analysis means, for example, calculating the difference ($\Delta E$) between the measured data of L, a, and b of each patch and the L, a, and b data of the target values as shown in the patch DB 12900 using an equation determined in advance for each determination criterion.

In step S2703, the CPU 401 obtains, from the data management module 704, the threshold for the determination criterion set for the printing apparatus 203 that is the transmission source of the color verification measured data, and compares it with the data calculated in step S2702. The CPU 401 then determines whether or not the comparison result falls within the determination criterion, and advances to step S2704. In this determination, the CPU 401 not only determines all items of each determination criterion but also finally determines whether or not the color state of the printing apparatus 203 is an appropriate state. At this time, if at least one of the determination results of the determination criteria does not satisfy the determination criterion, the CPU 401 determines that the color state of the printing apparatus 203 is an inappropriate state (NG). In step S2704, the CPU 401 saves, as the color verification result, the measured data received in step S2701, the analysis data analyzed in step S2702, and the determination results determined in step S2703 in the data management module 704 in association with the date and the information of the printing apparatus 203, and advances to step S2705. Here, if an obtaining request is received from the site management terminal 211, the color verification result is transmitted to the site management terminal 211 via the site management terminal communication module 702. Additionally, if a color verification result display request is received from the user, the site management terminal 211 obtains the color verification result from the site management server 102 via the data transmission/reception module 721, and displays the color verification result as shown in FIGS. 22 to 24. That is, the color verification result held here is saved to be displayable in response to a display request from the user. The site management server 102 does not actively notify the color verification result.

Next, the process advances to step S2705, and the CPU 401 determines whether or not the result of determination in step S2703 is NG. If the determination result is determined as NG, the process advances to step S2706. If the determination result is determined as OK, the process advances to step S2709. In step S2706, the CPU 401 determines whether or not all color adjustment processes that are set as recovery processing in a case in which the determination result is NG are already executed. If there is an unexecuted process in the color adjustment processes set as recovery processing, the process advances to step S2708. If all color adjustment processes are already executed, the process advances to step S2707. In step S2707, the CPU 401 determines that the color state of the image printed by the printing apparatus 203 is not improved from the inappropriate state although all the preset color adjustment processes are executed. The CPU 401 then notifies the user that the color state of the image printed by the printing apparatus 203 is inappropriate, and advances to step S2709.

On the other hand, since it is determined in step S2706 that there is an unexecuted color adjustment processes, in step S2708, the CPU 401 transmits the contents of the unexecuted color adjustment process to the printing apparatus 203 together with the determination result of color verification data in step S2703 via the printer communication module 703, and returns to step S2701. In step S2709, the CPU 401 transmits a notification representing that additional color adjustment is unnecessary to the printing apparatus 203 together with the determination result of color verification data in step S2703 via the printer communication module 703, and ends the processing.

With this processing, the site management server 102 can obtain the measured data of the standard color patches and custom color patches instructed to the printing apparatus and determine, based on the determination criterion, whether or not the color state of the printing apparatus is appropriate.

Characteristic processing of the printing apparatus 203 that performs communication of various kinds of data and commands with the site management server 102 will be described next in detail with reference to the flowchart of FIG. 28.

Figure 28:
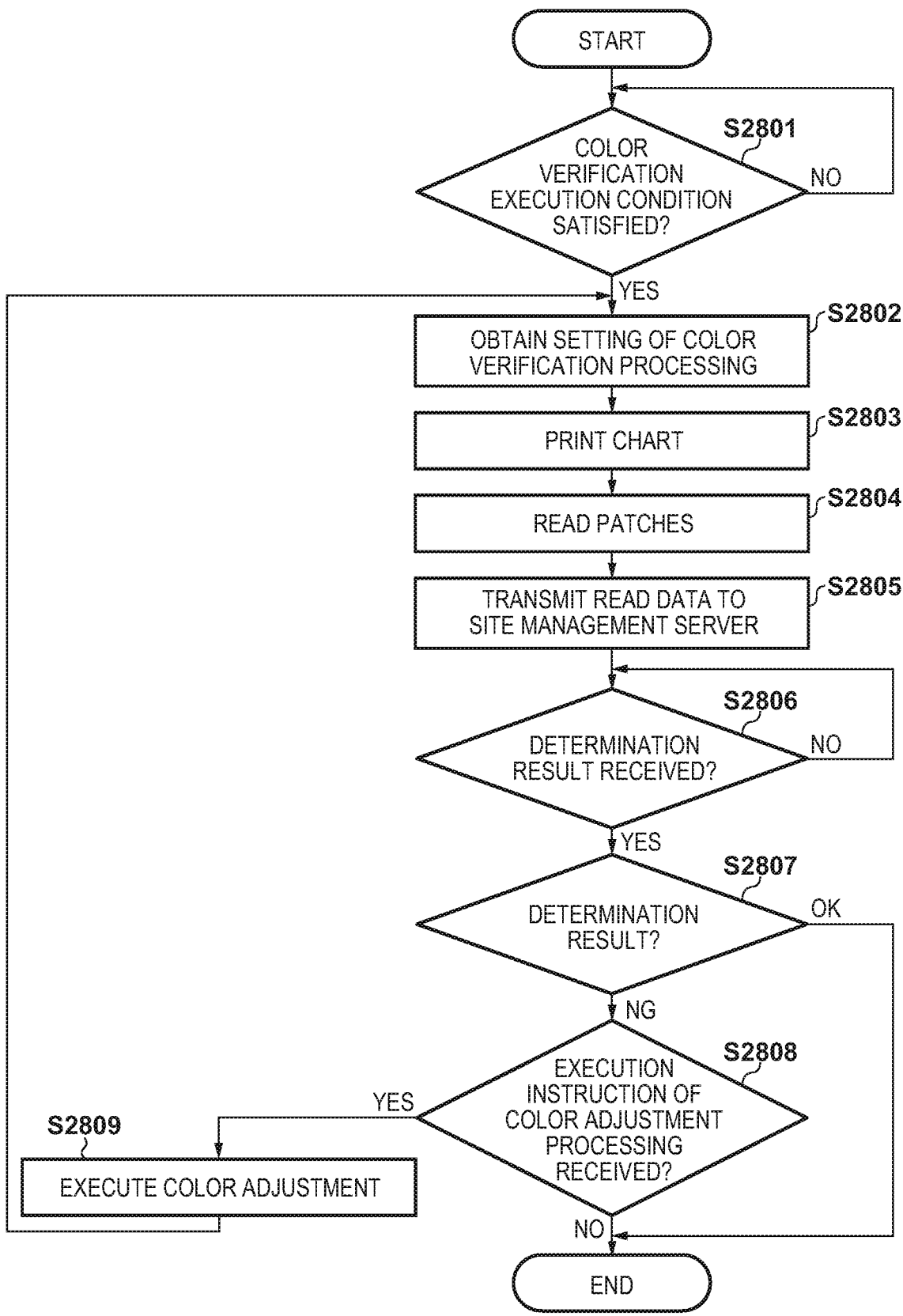
FIG. 28 is a flowchart for describing processing executed by the printing apparatus according to the first embodiment.

FIG. 28 is a flowchart for describing processing executed by the printing apparatus 203 according to the first embodiment. Note that the processing represented by the flowchart is implemented when the CPU 501 deploys a program stored in the HDD 504 into the RAM 503 and executes the deployed program.

First, in step S2801, the CPU 501 determines, based on a color verification execution condition described in the color verification execution condition DB 1220, whether or not the color verification execution condition is satisfied. Upon determining that the color verification execution condition is satisfied, the process advances to step S2802. In step S2802, the CPU 501 obtains settings necessary for executing color verification processing from the data management module 806 by referring to the patch chart 1213, the sheet 1216, and the job property 1217 in the color verification setting DB 1210, and advances to step S2803. In step S2803, the CPU 501 arranges patch data on an appropriate sheet based on the settings obtained in step S2802, causes the print control module 802 to control such that the print unit 509 executes printing of the chart image, and advances to step S2804.

In step S2804, the CPU 501 controls the sensor control module 803 such that the color sensor 510 incorporated in the printer 508 reads the sheet used to print the chart image in step S2803. The data read by the color sensor 510 is held in association with the patch on each chart image, and the process advances to step S2805. In step S2805, the CPU 501 transmits the read data held in step S2804 to the site management server 102 via the data transmission/reception module 804, and advances to step S2806.

In step S2806, the CPU 501 determines whether or not the determination result of the read data at the time of color verification is received from the site management server 102 via the data transmission/reception module 804. Upon determining that the determination result is received, the process advances to step S2807. In step S2807, the CPU 501 determines whether the determination result received in step S2806 is OK or NG. If the determination result is OK (the color state is appropriate), the processing is ended. If the determination result is NG (the color state is inappropriate), the process advances to step S2808. In step S2808, the CPU 501 determines whether or not a color adjustment execution instruction is received from the site management server 102 via the data transmission/reception module 804. Upon determining that the color adjustment execution instruction is received, the process advances to step S2809. Upon determining that a notification representing that color adjustment is unnecessary is received, the processing is ended. In step S2809, the CPU 501 controls such that color adjustment processing according to the color adjustment instruction received in step S2808 is executed by the color management module 805. When the color adjustment processing is completed, the process returns to step S2802 to start color verification processing to verify whether an appropriate color state is obtained.

A case in which the printing apparatus 203 executes color verification processing when the execution condition of color verification processing is satisfied has been described here. However, the present invention is not limited to this. For example, a color verification processing execution request from the user may be accepted via the console unit 512 of the printing apparatus 203, and the control procedure from step S2702 may be executed. In addition, the color verification processing execution request from the user may be accepted via the site management terminal 211. Furthermore, the site management server 102 may check whether or not the color verification execution condition is satisfied and notify the execution instruction of color verification processing.

Similarly, in the first embodiment, analysis of read data of color verification and determination of the color verification state are executed by the site management server 102. However, the present invention is not limited to this. For example, the determination criterion may be held in advance in the data management module 806 of the printing apparatus 203, and when color verification processing is executed by the printing apparatus 203, the printing apparatus 203 may determine whether or not the result falls within the determination criterion.

Furthermore, in the first embodiment, if it is determined, by the determination of color verification, that the color state of the printing apparatus 203 is not appropriate, execution of color adjustment processing is instructed from the site management server 102. However, the present invention is not limited to this. For example, color adjustment processing and the execution order may be held in advance in the data management module 806 of the printing apparatus 203, and when it is found in the printing apparatus 203 that the color state of the printed image is inappropriate, the printing apparatus 203 may automatically execute color adjustment processing. At this time, the site management server 102 may be notified of the execution of the color adjustment processing as well.

With this arrangement, color verification processing of custom colors and that of standard colors are executed as single processing. In addition, in the operation of adding a standard color to the custom colors as a target of color verification processing, color verification processing conditions set for the custom colors are referred to, and a patch group of appropriate standard colors is automatically added. This makes it possible to implement a strict color management operation without increasing the operation burden on the color expert.

Second Embodiment

In the above-described first embodiment, color verification processing of custom colors and that of standard colors are integrated into single processing. Accordingly, determination criteria referred to when determining whether the color value (color state) of an image printed by a printing apparatus 203 is appropriate (whether a required quality standard of color is satisfied) are common.

However, depending on the policy of a print site or the contents of a print job or customer demand, the importance of the custom colors may be higher than that of the standard colors. In this case, a requirement to make the determination criterion for color verification processing of the custom colors stricter than the determination criterion for color verification processing of the standard colors can be assumed. For example, a determination criterion is set such that a tolerant reference value (for example, the average color difference is 6.0 or less) is set for the standard colors, and a stricter reference value (the average color difference is 3.0 or less) is set for the custom colors. If an operation is performed to execute color verification processing for each of the standard colors and custom colors to meet this requirement, the above-described reduction of operation burden on the color expert cannot be implemented.

In the second embodiment, a method will be described in which while color verification processing of the standard colors and that of the custom colors are handled using single color verification settings, determination criteria are allowed to be individually set, and additionally, a final determination result is decided from both determination results. Note that a system arrangement according to the second embodiment, the hardware arrangement of each apparatus, and the like are the same as in the above-described first embodiment, and a description thereof will be omitted.

<Information Databases>

Details of information databases according to the second embodiment will be described first with reference to FIG. 29.

FIG. 29 depicts a view for explaining a determination criterion database according to the second embodiment. Note that the same reference numerals as those for items of the determination criterion DB 1260 according to the above-described first embodiment denote the same items in the determination criterion database.

A determination criterion DB 2901 and a sub-determination criterion DB 2910 are saved in a data management module 704 of a site management server 102. Each control module performs data updating and information transmission/reception to/from a centralized management server 101, a site management terminal 211, and a printing apparatus 203, as needed. However, the saving location of the databases is not limited to this and may be a data management module 603 of the centralized management server 101, or the data management module 806 of a printer controller 500 in the printing apparatus 203. Note that only differences from the information databases according to the above-described first embodiment will be described below. Components other than the differences are the same as in the first embodiment, and a description thereof will be omitted.

The determination criterion DB 2901 is a determination criterion DB according to the second embodiment. A sub-determination presence/absence flag 2902 is information representing whether or not there are provided a plurality of sub-determinations to be used for final determination. In the second embodiment, the sub-determinations correspond to determination of standard colors and determination of custom colors. A sub-determination criterion 2903 is link information to the sub-determination criterion DB 2910 to be described later. Links to all of the plurality of sub-determinations are recorded.

A target patch 2911 records patch information that is the execution target of the sub-determination. For example, assume that of patches 001 through patch 0XX registered in a patch chart DB 1240, patch 001 through patch 00M are custom colors, and patch 00N through patch 0XX are standard colors (N and M are natural numbers, N=M+1). In this case, the target patches 2911 in the sub-determination criterion DB 2910 corresponding to the custom colors are "001 . . . , 00M". On the other hand, the target patches 2911 in the sub-determination criterion DB 2910 corresponding to the standard colors are "00M . . . , 0XX".

<Individual Determination Criterion Registration Method>

Processing of individually setting a determination criterion for each of the standard colors and the custom colors will be described next.

Figure 26B:
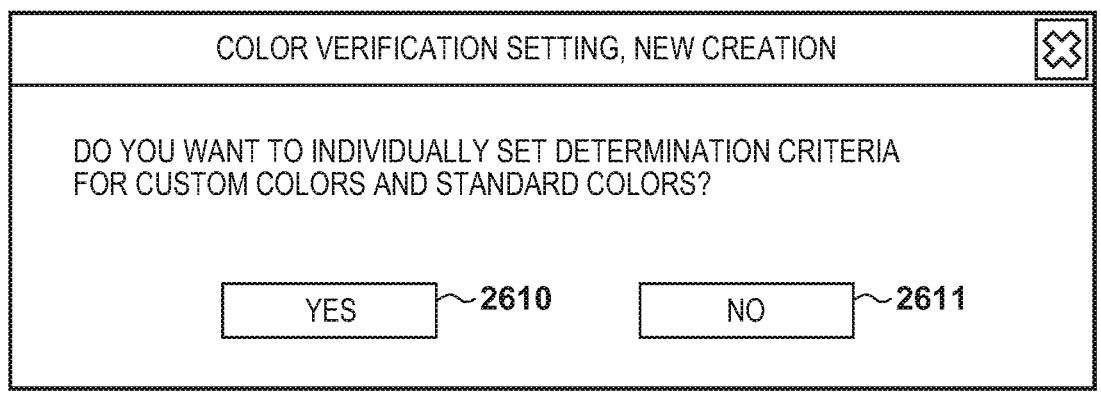
FIG. 26B depicts a view showing an example of a necessity verification UI screen for a color-specific determination criterion displayed in the second embodiment.

When a "YES" button 2602 in a standard color addition verification UI screen shown in FIG. 26A is pressed in step S2511 described above, a CPU 401 displays a necessity verification UI screen for a color-specific determination criterion shown in FIG. 26B on a display unit.

FIG. 26B depicts a view showing an example of a necessity verification UI screen for a color-specific determination criterion displayed in the second embodiment. Here, a query is made concerning whether or not to individually set determination criteria for the custom colors and the standard colors. When a "NO" button 2611 is pressed in the necessity verification UI screen for a color-specific determination criterion, the CPU 401 advances to the same processing as in the first embodiment. On the other hand, when a "YES" button 2610 is pressed in the necessity verification UI screen for a color-specific determination criterion, the CPU 401 newly creates the sub-determination criterion DB 2910.

At this time, some of settings done for the determination criterion DB 2901 before step S2511 are copied to the newly created sub-determination criterion DB 2910 for custom colors and then initialized. More specifically, the settings are settings 1263 through 1269. In addition, "presence" is recorded in the sub-determination presence/absence flag 2902 of the determination criterion DB 2901, and link information to the newly created sub-determination criterion DB 2910 is recorded in the sub-determination criterion 2903. Furthermore, the CPU 401 refers to a patch type 12913 in a patch DB 12900 (FIG. 12C) and records it in the target patch 2911 in the sub-determination criterion DB 2910.

Next, the CPU 401 accepts input of the determination criteria of the added standard colors from the color expert.

Figure 30:
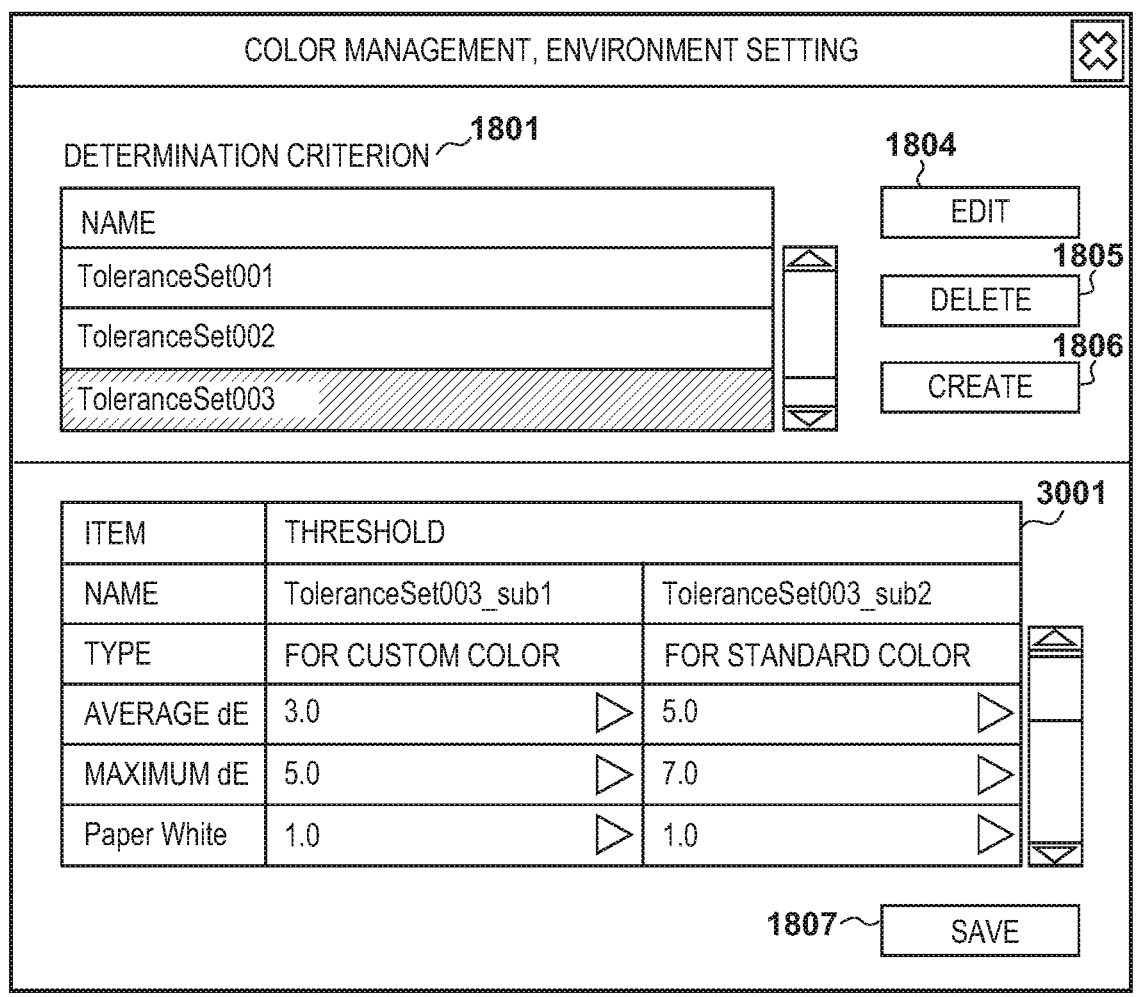
FIG. 30 depicts a view for explaining an example of a determination criterion editing screen in the environment setting of the site management application according to the second embodiment.

FIG. 30 depicts a view for explaining an example of a determination criterion editing screen in the environment setting of the site management application according to the second embodiment. Note that the same reference numerals as in FIG. 18 according to the above-described first embodiment denote the same parts.

In a list 3001, the detailed information of a determination criterion setting is displayed. Here, the information of a determination criterion is displayed for each color type, and input of determination criterion information is accepted. The CPU 401 accepts the input of the determination criterion information for the standard colors from the color expert via the UI screen.

<Determination Processing>

Determination processing (step S2703) in color verification processing executed by the site management server 102 in the second embodiment will be described next in detail with reference to the flowchart of FIG. 31.

Figure 31:
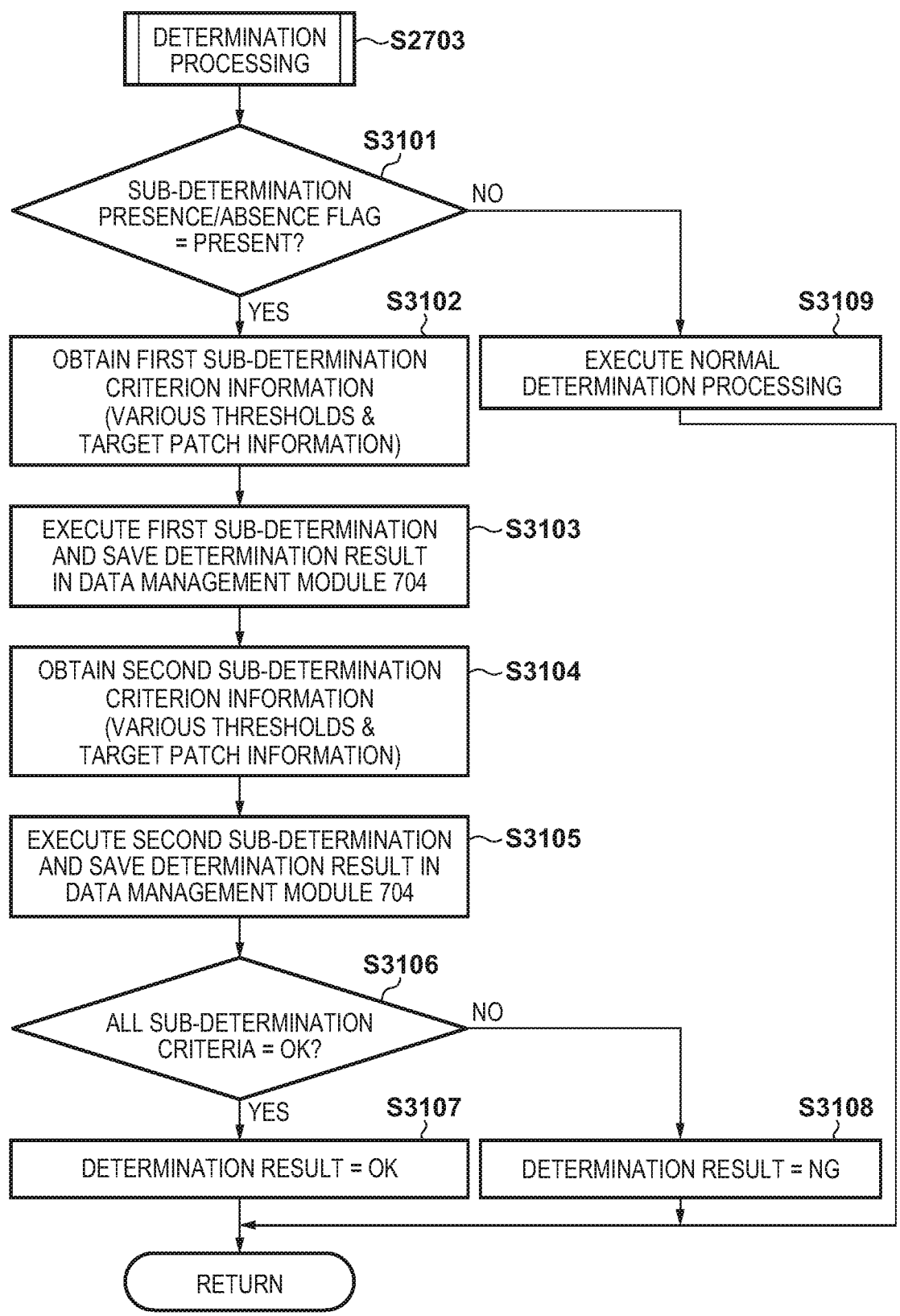
FIG. 31 is a flowchart for describing determination processing in step S2703 of FIG. 27 according to the second embodiment.

FIG. 31 is a flowchart for describing determination processing in step S2703 of FIG. 27 according to the second embodiment.

First, in step S3101, the CPU 401 refers to the sub-determination presence/absence flag 2902 in the determination criterion DB 2901, and determines whether or not sub-determination processing is set. Upon determining here that "sub-determination is absent", the process advances to step S3109 to execute the same determination processing as in the first embodiment, and the processing is ended. On the other hand, upon determining that "sub-determination is present", the process advances to step S3102. In step S3102, the CPU 401 refers to the sub-determination criterion 2903 and obtains the first sub-determination criterion information. Note that the execution order of the sub-determination criterion is not taken into consideration. Next, the process advances to step S3103, and the CPU 401 executes the first sub-determination processing and saves the determination result in the data management module 704. Next, the process advances to step S3104, and the CPU 401 refers to the sub-determination criterion 2903 and obtains the second sub-determination criterion information. Then, the process advances to step S3105, and the CPU 401 executes the second sub-determination processing and saves the determination result in the data management module 704. Next, the process advances to step S3106, and the CPU 401 determines whether or not the determination results are OK for all the sub-determination criteria recorded in the sub-determination criterion 2903. Upon determining here that the determination results for all the sub-determination criteria are OK, the process advances to step S3107. The CPU 401 records the final determination result as OK in the data management module 704 and ends the processing. On the other hand, upon determining here that the determination results for all the sub-determination criteria are not OK, the process advances to step S3108. The CPU 401 records the final determination result as NG in the data management module 704 and ends the processing.

<Determination Result Display UI Screen>

FIG. 32 depicts a view showing an example of a color verification result screen displayed by a site management application according to the second embodiment. Note that the same reference numerals as in FIG. 23 according to the above-described first embodiment denote the same parts in FIG. 32.

In this determination result detail screen, an "all" tab 3201, a "custom color" tab 3202, and a "standard color" tab 3203, which enable selection of a color type as a display target, are displayed. When the "all" tab 3201 is selected, a final determination result item (OK or NG) is displayed. When the "custom color" tab 3202 is selected, determination result detail data only for the custom colors is displayed. Similarly, when the "standard color" tab 3203 is selected, determination result detail data only for the standard colors is displayed. FIG. 32 shows a state in which the "custom color" tab 3202 is selected.

Note that in the second embodiment, the function of selecting a color type as a display target is provided only in the determination result detail screen. However, the present invention is not limited to this. The function of selecting a color type as a display target may be provided in the above-described patch measured result detail display screen.

As described above, according to the second embodiment, in a case in which the custom colors are set, both color verification processing of the custom colors and color verification processing of the standard colors are executed together. At this time, common sheets and calibration are used in both color verification processes. While color verification processing of the standard colors and color verification processing of the custom colors are handled as single processing, the determination criteria can individually be set. Then, the final determination result can be decided from both determination results. This makes it possible to provide a determination criterion for each color type according to importance without increasing the operation burden on the color expert.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-28210, filed Feb. 20, 2018, which is hereby incorporated by reference herein in its entirety.

What is claimed is:

1. An information processing apparatus for managing a printing apparatus in a print site including at least one printing apparatus, comprising:
   a memory that stores a set of instructions; and
   at least one processor that executes the instruction to:
      determine a custom color that is used in a color verification operation of the at least one printing apparatus;
      obtain an input profile of a color verification setting of the determined custom color;
      display a screen for selecting whether or not to add a standard color corresponding to the obtained input profile to the color verification operation; and
      according to having received an instruction, via the screen, for adding the standard color to the color verification operation, instruct the at least one printing apparatus to perform printing in accordance with the color verification setting, including the input profile, for the custom color and the standard color.

2. The information processing apparatus according to claim 1, wherein in a determination of the custom color, the at least one processor extracts the custom color from data for printing and determines the custom color.

3. The information processing apparatus according to claim 1, wherein in a determination of the custom color, the at least one processor determines the custom color based on imported CMYK values.

4. The information processing apparatus according to claim 1, wherein in a determination of the custom color, the at least one processor determines the custom color based on CMYK values of a patch chart input by the user.

5. The information processing apparatus according to claim 1, wherein in obtaining of the input profile, the at least one processor obtains an input profile selected by the user from input profiles of the color verification setting linked with the at least one printing apparatus as the input profile of the color verification setting of the custom color.

6. The information processing apparatus according to claim 5, wherein the at least one processor executes the instructions further to cause the user to select whether or not to automatically perform obtaining of the input profile of the color verification setting of the custom color.

7. The information processing apparatus according to claim 1, wherein the at least one processor executes the instructions further to determine a color state of the printing apparatus based on measured data transmitted from the at least one printing apparatus in accordance with the instruction to perform printing and a threshold for a determination criterion set for the printing apparatus.

8. The information processing apparatus according to claim 7, wherein in a determining of the color state, the at least one processor determines the color state of the printing apparatus based on the threshold individually set for the color verification operation of the color verification setting for the custom color and the standard color, and determines that the color state of the printing apparatus is appropriate in a case in which the determination criterion is satisfied in both the color verification operation of the color verification setting for the custom color and the standard color.

9. The information processing apparatus according to claim 7, wherein the at least one processor executes the instructions further to display a result of determining the color state of the printing apparatus based on thresholds individually set for the color verification operation for the custom color and the standard color.

10. The information processing apparatus according to claim 9, wherein in a displaying of the result of determining the color state, the at least one processor displays the result of determining the color state of the printing apparatus for each of the custom color and the standard color.

11. A color management system including an information processing apparatus and a printing apparatus arranged in a print site,
   wherein the information processing apparatus, comprises:
      a first memory that stores a set of instructions; and
      at least one first processor that executes the instruction to:
         determine a custom color that is used in a color verification operation of the at least one printing apparatus;
         obtain an input profile of a color verification setting of the determined custom color;
         display a screen for selecting whether or not to add a standard color corresponding to the specified input profile to the color verification operation; and
         according to having received an instruction, via the screen, for adding the standard color to the color verification operation, instruct the at least one printing apparatus to perform printing in accordance with the color verification setting, including the input profile, for the custom color and the standard color, and
   wherein the printing apparatus comprises:
      a second memory that stores a set of instructions; and
      at least one second processor that executes the instruction to:
         as the color verification operation, print a chart in accordance with the color verification setting for the custom color and the standard color and transmit a value obtained by measuring the chart as a result of the color verification to the information processing apparatus.

12. A method of controlling an information processing apparatus for managing a printing apparatus in a print site including at least one printing apparatus, the method comprising:

determining a custom color that is used in a color verification operation of the at least one printing apparatus;

obtaining an input profile of a color verification setting of the determined custom color;

displaying a screen for selecting whether or not to add a standard color corresponding to the obtained input profile to the color verification operation; and according to having received an instruction, via the screen, for adding the standard color to the color verification operation, instructing the at least one printing apparatus to perform printing in accordance with the color verification setting, including the input profile, for the custom color and the standard color.

13. A non-transitory computer readable storage medium storing a program for causing a processor to execute a method of controlling an information processing apparatus for managing a printing apparatus in a print site including at least one printing apparatus, the method comprising:

determining a custom color that is used in a color verification operation of the at least one printing apparatus;

obtaining an input profile of a color verification setting of the determined custom color;

displaying a screen for selecting whether or not to add a standard color corresponding to the obtained input profile to the color verification operation; and according to having received an instruction, via the screen, for adding the standard color to the color verification operation, instructing the at least one printing apparatus to perform printing in accordance with the color verification setting, including the input profile, for the custom color and the standard color.

* * * * *